United States Patent
Sekiguchi et al.

(10) Patent No.: US 9,426,377 B2
(45) Date of Patent: Aug. 23, 2016

(54) IMAGE CAPTURING APPARATUS, IMAGE CAPTURING METHOD, STORAGE MEDIUM, AND DEVICE CONTROL SYSTEM FOR CONTROLLING VEHICLE-MOUNTED DEVICES

(71) Applicants: Hiroyoshi Sekiguchi, Kanagawa (JP); Shintaroh Kida, Kanagawa (JP); Kohji Oshikiri, Kanagawa (JP); Izumi Itoh, Tokyo (JP)

(72) Inventors: Hiroyoshi Sekiguchi, Kanagawa (JP); Shintaroh Kida, Kanagawa (JP); Kohji Oshikiri, Kanagawa (JP); Izumi Itoh, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/857,932

(22) Filed: Sep. 18, 2015

(65) Prior Publication Data

US 2016/0100088 A1   Apr. 7, 2016

(30) Foreign Application Priority Data

Oct. 3, 2014  (JP) ................................ 2014-204501
Jul. 3, 2015  (JP) ................................ 2015-134538

(51) Int. Cl.
*G06K 9/20* (2006.01)
*H04N 5/235* (2006.01)
(Continued)

(52) U.S. Cl.
CPC ............ *H04N 5/2352* (2013.01); *B60S 1/0844* (2013.01); *B60W 50/00* (2013.01); *G06K 9/00791* (2013.01); *G06K 9/209* (2013.01); *G06K 9/2018* (2013.01);
(Continued)

(58) Field of Classification Search
CPC ............................ G06K 9/2018; B60S 1/0844
See application file for complete search history.

(56) References Cited

U.S. PATENT DOCUMENTS

2005/0237385 A1* 10/2005 Kosaka ................. G01B 11/00
                                                                      348/42
2012/0098968 A1*  4/2012 Schofield ........... G06K 9/00818
                                                                      348/148
(Continued)

FOREIGN PATENT DOCUMENTS

EP          1507138 A2    2/2005
JP          2005-195566   7/2005
(Continued)

OTHER PUBLICATIONS

U.S. Appl. No. 14/630,078, filed Feb. 24, 2015.
(Continued)

*Primary Examiner* — Thomas Tarcza
*Assistant Examiner* — Alex C Dunn
(74) *Attorney, Agent, or Firm* — Harness, Dickey & Pierce, P.L.C.

(57) ABSTRACT

An image capturing apparatus includes a light source to emit first light to a light translucent member, an image sensor to capture an adhering detection frame for acquiring an adhering detection image to detect a substance adhering on the light translucent member by using the first light emitted from the light source, and to capture object recognition frames for acquiring object recognition images for recognizing objects other than the substance by receiving second light, and circuitry to set a frame time of the adhering detection frame shorter than a frame time of each of the object recognition frames, and to set an exposure time of an object recognition frame right after the adhering detection frame to a value that prevents overlapping of an exposure period of the adhering detection frame and an exposure period of the object recognition frame right after the adhering detection frame.

11 Claims, 15 Drawing Sheets

(51) Int. Cl.
*B60S 1/08* (2006.01)
*G06K 9/00* (2006.01)
*B60W 50/00* (2006.01)
*H04N 5/225* (2006.01)
*H04N 7/18* (2006.01)

(52) U.S. Cl.
CPC ........... *G06K 9/2027* (2013.01); *H04N 5/2253* (2013.01); *H04N 5/2351* (2013.01); *H04N 7/183* (2013.01); *B60W 2050/0043* (2013.01)

(56) References Cited

U.S. PATENT DOCUMENTS

| | | |
|---|---|---|
| 2013/0208120 A1 | 8/2013 | Hirai et al. |
| 2014/0029008 A1 | 1/2014 | Hirai et al. |
| 2014/0247357 A1 | 9/2014 | Sekiguchi |
| 2014/0270532 A1 | 9/2014 | Sawaki et al. |
| 2014/0303853 A1 | 10/2014 | Itoh et al. |
| 2014/0321709 A1 | 10/2014 | Kasahara et al. |
| 2015/0054954 A1 | 2/2015 | Itoh et al. |
| 2015/0142263 A1 | 5/2015 | Hirai et al. |
| 2015/0243017 A1 | 8/2015 | Fujimoto et al. |
| 2015/0334385 A1* | 11/2015 | Takemura ............ H04N 17/002 348/175 |

FOREIGN PATENT DOCUMENTS

| | | |
|---|---|---|
| JP | 2013-096891 | 5/2013 |
| JP | 2013-117520 | 6/2013 |
| WO | WO-2013065868 A1 | 5/2013 |
| WO | WO-2013065870 A1 | 5/2013 |

OTHER PUBLICATIONS

European Office Action dated Mar. 1, 2016 in corresponding European Application No. 15188090.3.

* cited by examiner

FIG. 13
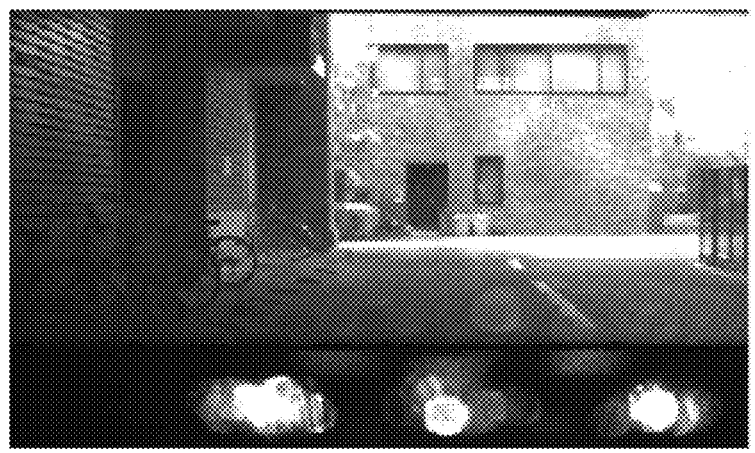
FIG. 14
FIG. 15
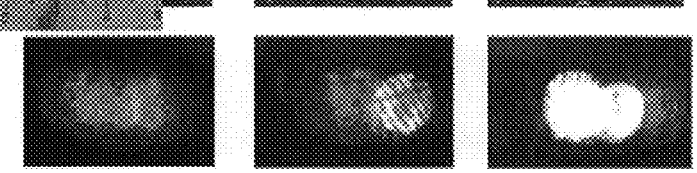

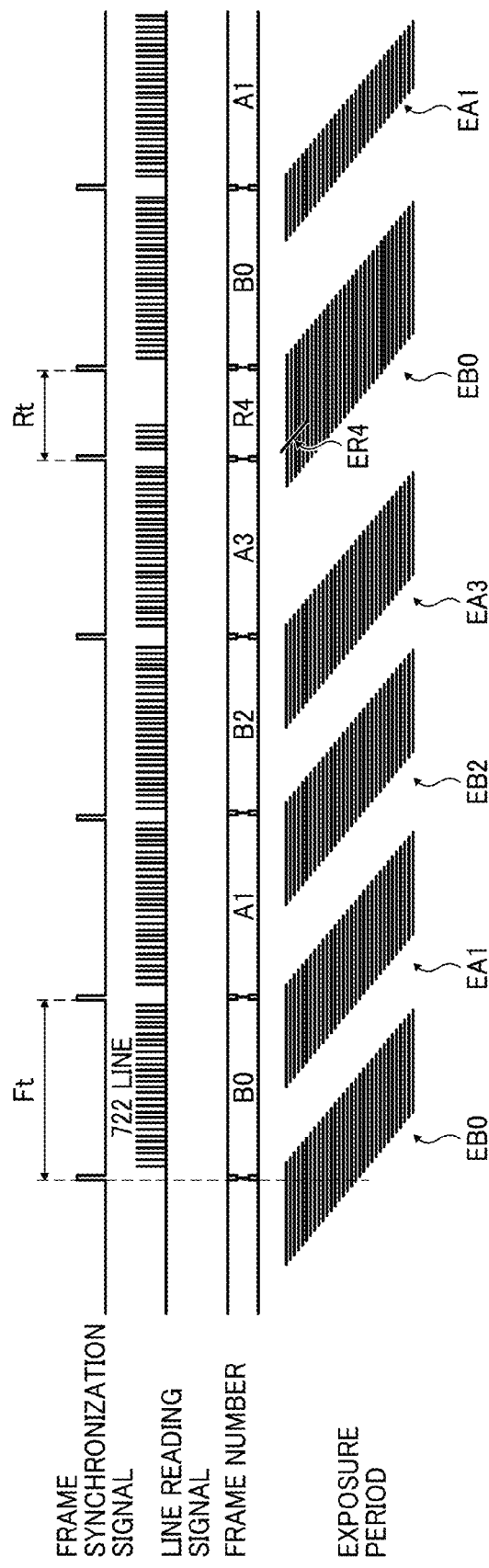

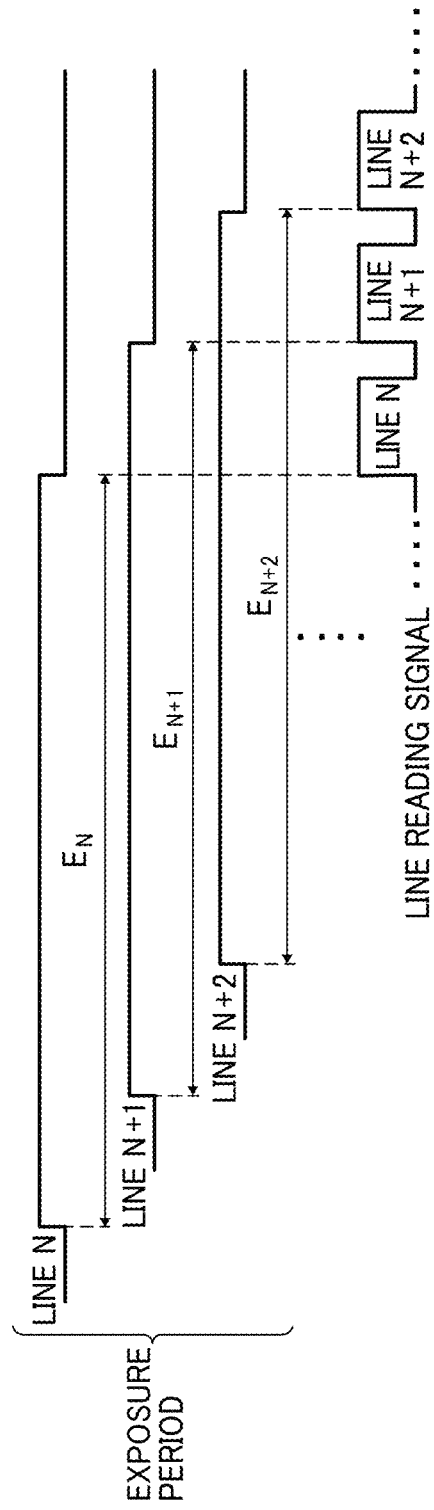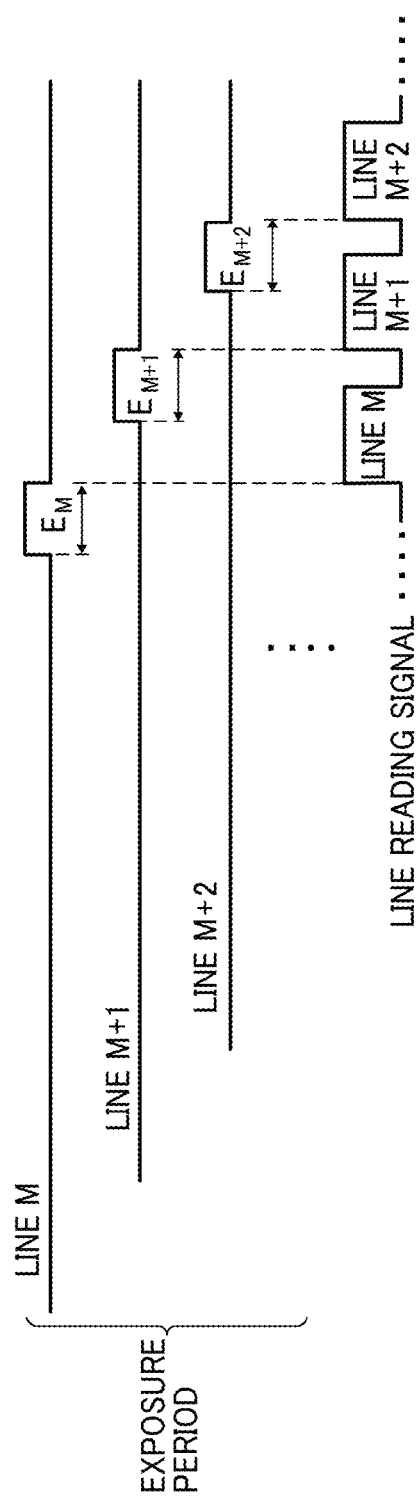

FIG. 26
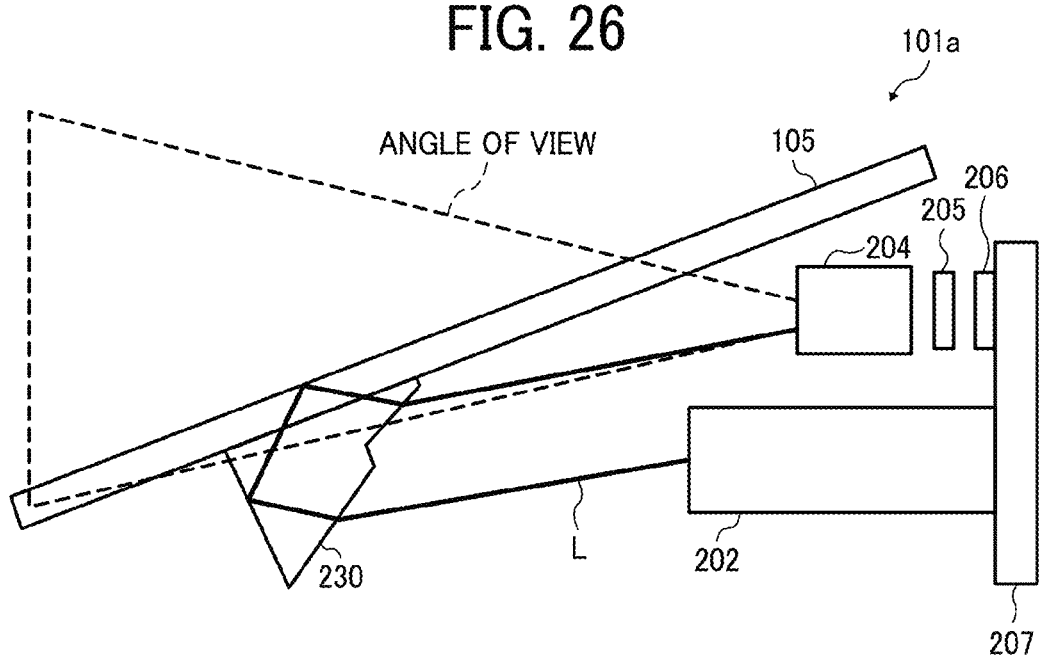
FIG. 27
IMAGE CAPTURED BY
DIGITAL CAMERA UNDER
FOCUSED CONDITION
(BLACK CLOTH AT BACK)
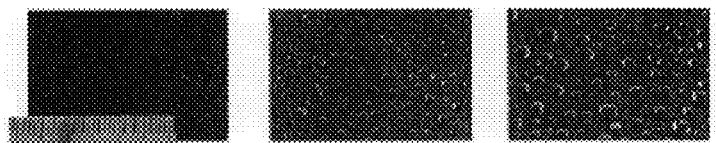
IMAGE CAPTURED
BY CAMERA
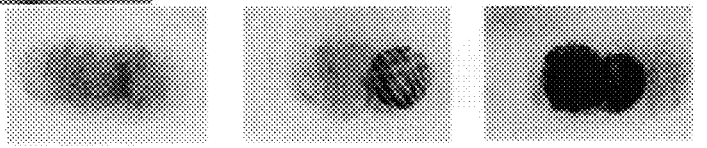
SMALL ←— RAINDROP AMOUNT —→ GREAT

IMAGE CAPTURING APPARATUS, IMAGE CAPTURING METHOD, STORAGE MEDIUM, AND DEVICE CONTROL SYSTEM FOR CONTROLLING VEHICLE-MOUNTED DEVICES

CROSS-REFERENCE TO RELATED APPLICATION

This application claims priority pursuant to 35 U.S.C. §119(a) to Japanese Patent Application Nos. 2014-204501, filed on Oct. 3, 2014 and 2015-134538, filed on Jul. 3, 2015 in the Japan Patent Office, the disclosure of which are incorporated by reference herein in their entirety.

BACKGROUND

1. Technical Field

The present invention relates to an image capturing apparatus, an image capturing method, a storage medium, and a device control system for controlling vehicle-mounted devices.

2. Background Art

Conventionally, vehicles are equipped with an image capturing apparatus using one image sensor to capture sensing-use images for recognizing objects (e.g., other vehicles, lanes, road surface, persons, obstacles) ahead of the vehicles, and adhering-detection-use images for detecting substance such as raindrop adhering on windshields of the vehicles.

For example, conventional image capturing apparatuses capture image capturing frames (sensing frames) for acquiring thirty sensing-use images consecutively and then captures one image capturing frame (adhering detection frame) for acquiring one adhering-detection-use image, and this image capturing operation is performed repeatedly. As to the conventional image capturing apparatuses, the sensing frames are captured by automatically adjusting an exposure time by using an automatic exposure control while the adhering detection frame is captured using a locked exposure time suitable for detecting an adhering substance.

As to the conventional image capturing apparatuses that capture an image of the adhering detection frame and images of the sensing frames consecutively, a time interval of sensing frames before and after one adhering detection frame becomes longer as a frame time of the adhering detection frame becomes longer. The longer the time interval between the sensing frames, the longer the elapsed time from a time point that captures the sensing frame before the adhering detection frame to a time point that captures the sensing frame after the adhering detection frame. Therefore, situations ahead of the vehicle (e.g., relative position of objects ahead the vehicle) may change greatly between the sensing frames before and after the adhering detection frame, with which recognition precision of objects ahead the vehicle may deteriorate. Therefore, it is preferable to set the frame time of the adhering detection frame shorter as much as possible.

However, a problem occurs when the sensing frame right after the adhering detection frame is captured under the automatic exposure control while the frame time of the adhering detection frame is set shorter. Specifically, when the sensing frame right after the adhering detection frame is captured under the automatic exposure control, the exposure time of the sensing frame becomes longer under dark environment such as in a tunnel or night. The exposure time means a time period from a start of receiving the light to an end of receiving the light by light receiving elements of the image sensor of the image capturing apparatus. Since a timing of outputting received-light quantity data of each of the light receiving elements from the image sensor is pre-set, if the exposure time is set longer, the light-receiving start time becomes earlier in view of the longer exposure time.

Normally, even if the frame time of the sensing frame is set with an exposure time corresponding to an upper limit settable by the automatic exposure control, the light-receiving start time of the sensing frame does not overlap the exposure period of the previous sensing frame. However, if the frame time of the adhering detection frame is set shorter than the frame time of the sensing frame, the light-receiving start time of the sensing frame right after the adhering detection frame may overlap the exposure period of the adhering detection frame right before the sensing frame. If the overlapping of exposure periods occurs, the received-light quantity data cannot be correctly acquired for at least one of the adhering detection frame and the sensing frame right after the adhering detection frame.

SUMMARY

In one aspect of the present invention, an image capturing apparatus is devised. The image capturing apparatus includes a light source to emit first light to a light translucent member, an image sensor to capture an adhering detection frame for acquiring an adhering detection image to detect a substance adhering on the light translucent member by using the first light emitted from the light source, and to capture one or more object recognition frames for acquiring one or more object recognition images for recognizing one or more objects other than the substance by receiving second light, different from the first light emitted from the light source, by performing an image capturing operation of the adhering detection frame and the object recognition frames repeatedly, and circuitry to set a frame time of the adhering detection frame shorter than a frame time of each of the object recognition frames, and to set an exposure time of an object recognition frame right after the adhering detection frame to a value that prevents overlapping of an exposure period of the adhering detection frame and an exposure period of the object recognition frame right after the adhering detection frame.

In another aspect of the present invention, a method of capturing images by using an image capturing apparatus is devised. The method includes the steps of emitting first light from a light source to a light translucent member, capturing an adhering detection frame for acquiring an adhering detection image to detect a substance adhering on the light translucent member by using the first light emitted from the light source and an image sensor, capturing one or more object recognition frames for acquiring one or more object recognition images for recognizing one or more objects other than the substance by receiving second light, different from the first light emitted from the light source, by using the image sensor by repeatedly performing an image capturing operation of the adhering detection frame and the object recognition frames, setting a frame time of the adhering detection frame shorter than a frame time of each of the object recognition frames, and setting an exposure time of an object recognition frame right after the adhering detection frame to a value that prevents overlapping of an exposure period of the adhering detection frame and an exposure period of the object recognition frame right after the adhering detection frame.

In another aspect of the present invention, a non-transitory computer-readable storage medium storing a program that, when executed by a computer, causes the computer to execute a method of capturing images by using an image capturing apparatus is devised. The method includes the steps of emitting first light from a light source to a light translucent member, capturing an adhering detection frame for acquiring an adhering detection image to detect a substance adhering on the light translucent member by using the first light emitted from the light source and an image sensor, capturing one or more object recognition frames for acquiring one or more object recognition images for recognizing one or more objects other than the substance by receiving second light, different from the first light emitted from the light source, by using the image sensor by repeatedly performing an image capturing operation of the adhering detection frame and the object recognition frames, setting a frame time of the adhering detection frame shorter than a frame time of each of the object recognition frames, and setting an exposure time of an object recognition frame right after the adhering detection frame to a value that prevents overlapping of an exposure period of the adhering detection frame and an exposure period of the object recognition frame right after the adhering detection frame.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 13 is an experiment result of images that were captured when raindrops adhered;

FIG. 14 is an experiment result of images that were captured when no raindrops adhered;

FIG. 15 shows expanded views of images captured for the raindrop detection image area 214 by differentiating the amount of raindrop;

FIG. 16 is a timing chart of an image capturing operation of a comparison example FIG. 17A indicates a relationship of data reading timing and exposure period for sensing frames employing a rolling shutter method;

FIG. 17B indicates a relationship of data reading timing and exposure period for raindrop detection frames employing a rolling shutter method.

FIG. 26 is a schematic configuration of an image capturing apparatus of a second example embodiment;

FIG. 27 is an expanded view of a raindrop detection image area used for detecting different amount of raindrop of the second example embodiment.

Figure 1:
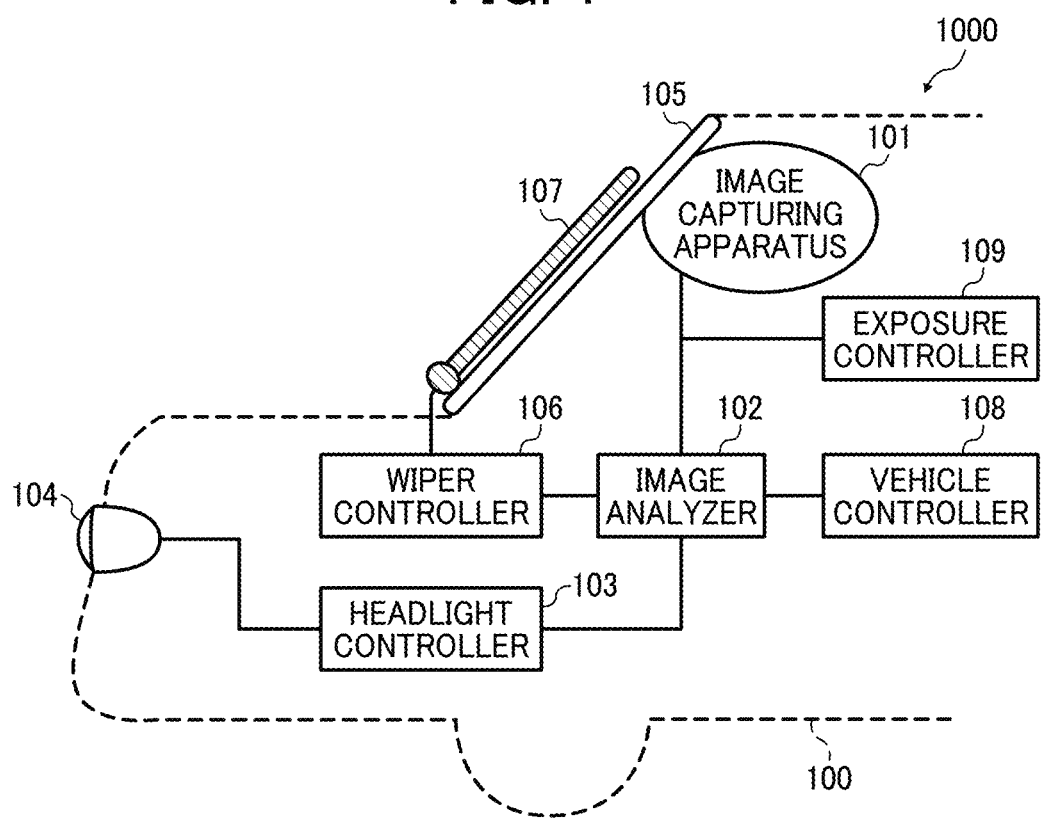
FIG. 1 illustrates a schematic configuration of a device control system to control vehicle-mounted devices according to a first example embodiment.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views illustrated in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, one or more apparatuses or systems according to one or more example embodiments are described hereinafter.

First Example Embodiment

A description is given of a device control system to control vehicle-mounted devices employing an image capturing apparatus according to a first example embodiment, in which the image capturing apparatus is equipped in a vehicle. Hereinafter, the device control system to control vehicle-mounted devices may be referred to as the "device control system" for the simplicity of the expression. The image capturing apparatus can be used with the device control system, but the image capturing apparatus can be applied for other systems having an object detector or object detection apparatus to perform detection of objects based on images captured by the image capturing apparatus. The vehicle may not be limited to any specific vehicles but includes various types of vehicles such as automobiles, ships, robots or the like.

FIG. 1 illustrates a schematic configuration of a device control system 1000 to control vehicle-mounted devices according to a first example embodiment. A vehicle 100 such as automobile includes the device control system 1000 to control vehicle-mounted devices, and an image capturing apparatus. In this disclosure, the vehicle 100 is explained as an example of movable apparatuses equipped with the device control system. The device control system 1000 can be applied to any types of movable apparatuses used under various environment. The image capturing apparatus can capture views of a front area of the vehicle 100 as captured image data. Based on the captured image data, the device control system 1000 can perform light control of headlight, wiper-drive control, and a control of other devices mounted in the vehicle 100.

As illustrated in FIG. 1, the device control system 1000 includes, for example, an image capturing apparatus 101 having an image capture device 200 (FIG. 2), an exposure controller 109, an image analyzer 102, a vehicle controller 108, a wiper controller 106, and a headlight controller 103. Each of the vehicle controller 108, the wiper controller 106, and the headlight controller 103 can be used as a controller to control various devices mounted in vehicle 100.

The image capture device 200 used for the device control system 1000 can be disposed in the image capturing apparatus 101. The image capture device 200 captures, for example, views of a front-area of the vehicle 100, wherein the front-area may be referred to as image capturing area or captured image area. For example, the image capture device 200 captures views of the front-area of the vehicle 100 when the vehicle 100 is running. The image capture device 200 may be, for example, disposed near a rear-view mirror disposed near a windshield 105 of the vehicle 100. Image data captured by the image capture device 200 of the image capturing apparatus 101 is input to the image analyzer 102. The exposure controller 109 performs an exposure control of the image capture device 200 of the image capturing apparatus 101.

The image analyzer 102 analyzes the captured image data, transmitted from the image capture device 200, in which the image analyzer 102 can be used to compute information of other vehicles existing in a front direction of the vehicle 100 such as position of other vehicles, a point of the compass (e.g., north, south, east, west) and distance to other vehicles. Further, the image analyzer 102 can be used to detect a substance such as raindrops, foreign particles, or the like adhering on the windshield 105. Further, the image analyzer 102 can be used to detect a detection-target object existing on road surfaces such as a lane (e.g., white line) or the like from the image capturing area. Further, the image analyzer 102 can be used to detect other vehicles. Further, the image analyzer 102 can be used to compute an amount of rain. Specifically, by recognizing tail lamps of other vehicles, the image analyzer 102 can detect a front-running vehicle (or ahead vehicle) running in front of the vehicle 100 in the same running direction, and by recognizing headlights of other vehicles, the image analyzer 102 can detect an oncoming vehicle coming toward the vehicle 100 such as head-to-head direction.

The computation result of the image analyzer 102 can be transmitted to the headlight controller 103. For example, the headlight controller 103 generates control signals to control a headlight 104 based on distance data computed by the image analyzer 102, wherein the headlight 104 is one of devices mounted in the vehicle 100. Specifically, for example, a switching control of high beam/low beam of the headlight 104 is performed, and a light-dimming control is partially performed for the headlight 104 to prevent a projection of high intensity light of headlight of the vehicle 100 to eyes of drivers of front-running vehicles and oncoming vehicles, by which the drivers of other vehicles are not dazzled by light coming from the headlight of the vehicle 100 while providing the enough field of view for the driver of vehicle 100.

The computation result of the image analyzer 102 is also transmitted to the wiper controller 106. The wiper controller 106 controls a wiper 107, which is one of devices mounted in the vehicle 100, to remove substance such as raindrops, foreign particles, or the like adhering on the windshield 105. The wiper controller 106 generates control signals to control the wiper 107 upon receiving the detection result of foreign particles from the image analyzer 102. When the control signals generated by the wiper controller 106 are transmitted to the wiper 107, the wiper 107 is activated to securely provide the field of view for the driver of the vehicle 100.

Further, the computation result of the image analyzer 102 is also transmitted to a vehicle controller 108, which controls the driving of the vehicle 100. If the vehicle 100 deviates or departs from the vehicle lane, defined by the lane (e.g., white line), based on the detection result of the lane detected by the image analyzer 102, the vehicle controller 108 activates an alarm or warning to the driver of the vehicle 100, and activates a cruise device control system such as controlling of a steering wheel and/or brake of the vehicle 100 to keep the vehicle 100 in the vehicle lane.

Figure 2:
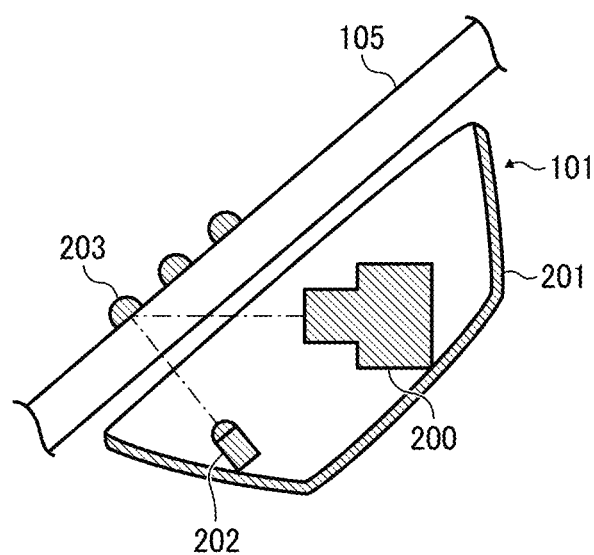
FIG. 2 illustrates a schematic configuration of an image capturing apparatus of the device control system of FIG. 1.
Figure 3A:
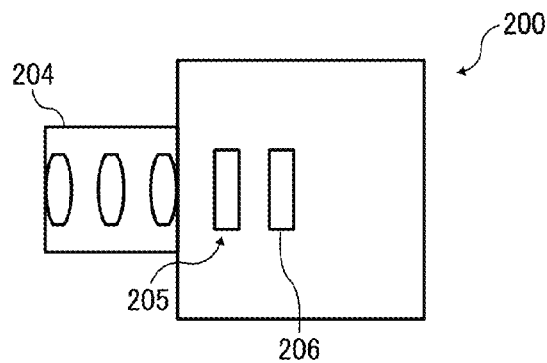
FIG. 3A illustrates a schematic configuration of an image capture device disposed in the image capturing apparatus.

FIG. 2 illustrates a schematic configuration of the image capturing apparatus 101, and FIG. 3A illustrates a schematic configuration of the image capture device 200 disposed in the image capturing apparatus 101. As illustrated in FIG. 2, the image capturing apparatus 101 includes, for example, the image capture device 200, a light source 202, and a casing 201 that encases the image capture device 200 and the light source 202. The image capturing apparatus 101 can be attached to an interior side of the windshield 105 of the vehicle 100. As illustrated in FIG. 3A, the image capture device 200 includes, for example, a capture lens 204, an optical filter 205, and an image sensor 206. The optical filter 205 may include a front-end filter 210 and a rear-end filter 220. The light source 202 emits light toward the windshield 105, and the light reflected at the outer face of the windshield 105 (i.e., reflection light) can enter the image capture device 200.

Figure 3B:
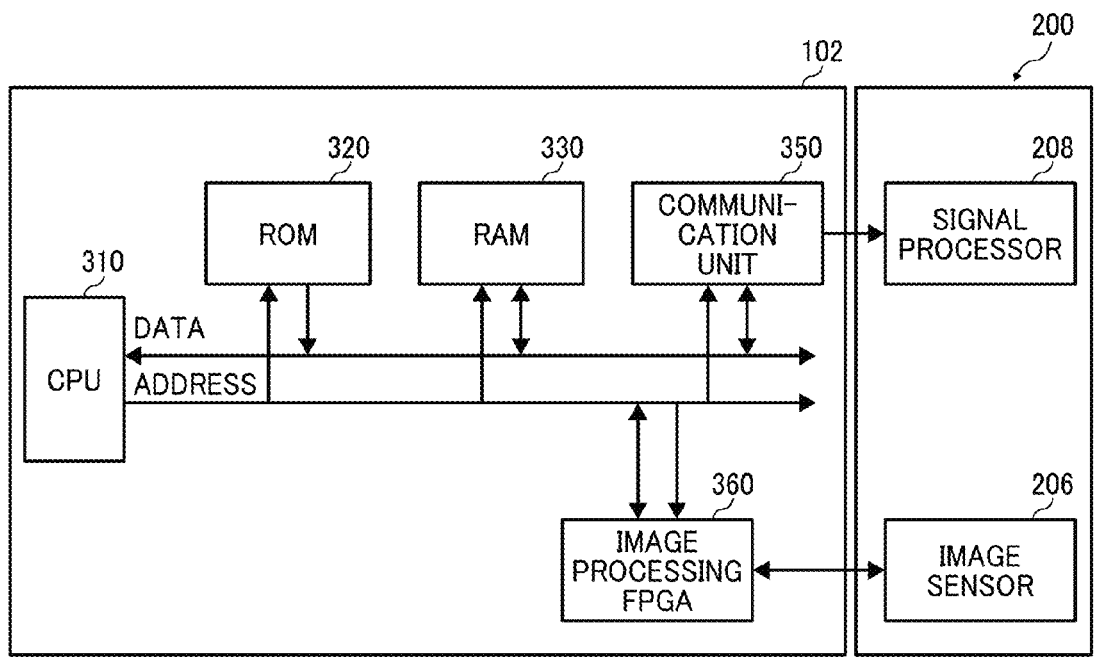
FIG. 3B is an example of a hardware configuration of an image analyzer.

FIG. 3B is an example of a hardware configuration of the image analyzer 102. The image analyzer 102 includes, for example, a central processing unit (CPU) 310, a read only memory (ROM) 320, a random access memory (RAM) 330, a communication unit 350, and an image processing field programmable gate array (FPGA) 360. The ROM 320 stores programs executable by the CPU 310. The RAM 330 is used as a working memory when executing the programs. The communication unit 350 is used to communicate with a signal processor 208 (see FIG. 10) such as transmitting a recognition result to the signal processor 208. The image processing FPGA 360 processes image data acquired by the image sensor 206. The image analyzer 102 can be implemented by using the image processing FPGA 360 programmed using programs and data stored in the ROM 320. The image analyzer 102 can be devised as a hardware or a combination of software and hardware. Specifically, image data acquired by the image sensor 206 can be processed by the CPU 310 that executes the programs stored in the RAM 330, or can be processed by the image processing FPGA 360 programmed using the programs. The frame determination can be performed by the image processing FPGA 360 or CPU 310. Specifically, the image processing FPGA 360 or CPU 310 performs the frame determination and exposure time control, in which frame numbers are assigned to given pixels composing an image, and the exposure time of the image sensor 206 corresponding to each of the frame numbers is controlled.

In the first example embodiment, the light source 202 emits light used for detecting substances such as raindrops adhering on the outer face of the windshield 105. Hereinafter, such substances may be referred to as a substance, adhered substance, adhering substance, or raindrop, as required. In this description, raindrop is used as an example of substance adhering on the outer face of the windshield 105. If a raindrop 203 adheres on the outer face of the windshield 105 as illustrated in FIG. 2, the light emitted from the light source 202 reflects at a boundary face between the raindrop 203 and the outer face of the windshield 105, and the reflected light enters the image capture device 200. Based on the image data captured by the image capture device 200, the raindrop 203 adhering on the windshield 105 can be detected.

Further, as illustrated in FIG. 2, the casing 201 of the image capturing apparatus 101 and the windshield 105 encases the image capture device 200 and the light source 202. With this encasing configuration by using the casing 201, even if fogging occurs on the inner face of the windshield 105, fogging may not occur to a part of the windshield 105 encased by the casing 201 of the image capturing apparatus 101. Therefore, an analysis failure by the image analyzer 102 due to the fogging of the windshield 105 can be prevented, and thereby various control operations can be effectively performed based on the analysis result of the image analyzer 102.

Further, the fogging of the windshield 105 may be used to control an air-conditioning system of the vehicle 100, in which the fogging of the windshield 105 can be detected using image data captured by the image capture device 200. In such a case, an air-flow path is formed at a part of the casing 201 so that a part of the windshield 105 facing the image capture device 200 has a same condition with other parts.

In the first example embodiment, a focus position of the capture lens 204 can be set infinity, or at positions between infinity and the windshield 105. With this setting, the detection of the raindrop 203 on the windshield 105, the detection of the front-running vehicle and the oncoming vehicle, and the detection of the lane (e.g., white line) can be performed by obtaining suitable information from the image data captured by the image capture device 200.

For example, the raindrop 203 adhering on the windshield 105 can be detected as follows. Typically, an image of a raindrop, captured as image data, is observed as a circle shape. Therefore, when to recognize a candidate raindrop image as a raindrop image (i.e., shape recognition processing), it is determined whether the candidate raindrop image in the captured image data has a circle shape. The shape recognition processing can be effectively performed by setting the focus of the capture lens 204 at infinity, or between infinity and the windshield 105 rather than setting the focus of the capture lens 204 at the raindrop 203 on the outer face of the windshield 105. If the focus of the capture lens 204 is set at infinity, or between infinity and the windshield 105, the image can be captured with a given level of out-of-focused condition or defocused condition, with which shape recognition performance of raindrop such as recognizing the raindrop as a circle shape can be enhanced, and thereby the raindrop detection performance can be enhanced.

Figure 4:
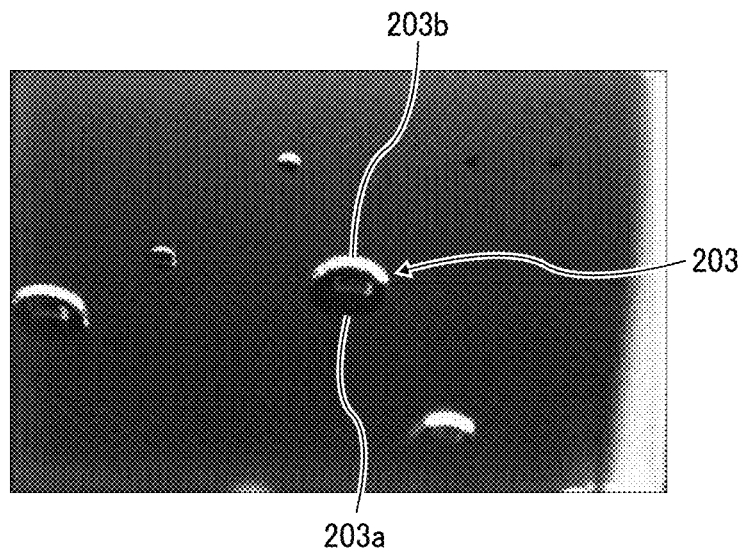
FIG. 4 illustrates infrared image data, which is captured as image data for raindrop detection, in which the focus of a capture lens 204 is set at a raindrop on an outer face of a windshield.
Figure 5:
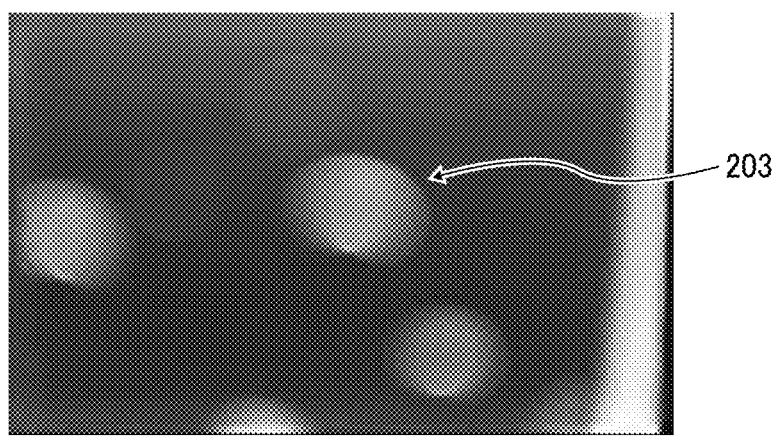
FIG. 5 illustrates another infrared image data, which is captured as image data for raindrop detection, in which the focus of the capture lens is set at infinity.

FIG. 4 illustrates infrared image data, which is captured as image data for the raindrop detection, in which the focus of the capture lens 204 is set at the raindrop 203 on the outer face of the windshield 105. FIG. 5 illustrates another infrared image data, which is captured as image data for the raindrop detection, in which the focus of the capture lens 204 is set at infinity. When the focus of the capture lens 204 is set at the raindrop 203 on the outer face of the windshield 105, a raindrop image may be captured with a background image 203a being projected on a raindrop as illustrated in FIG. 4. The background image 203a may cause a detection malfunction of the raindrop 203. Further, as illustrated in FIG. 4, a raindrop boundary 203b, which is a part of raindrop, may become an arc-like shape having a greater intensity. A shape of the raindrop image having such having greater intensity changes depending on the direction of sun light and/or position of streetlamp, in which the shape of raindrop image changes in various patterns. If the shape recognition processing is required to handle such various patterns, the processing load becomes great, and further, the recognition precision may deteriorate.

By contrast, when the focus of the capture lens 204 is set at infinity as illustrated in FIG. 5, an image is captured with a given level of out-of-focused condition or defocused condition. Therefore, a ghost image of the background image 203a is not projected or included in the captured image data, and thereby a detection malfunction of the raindrop 203 can be reduced. Further, the shape of images of out-of-focused condition may not change greatly even if the direction of sun light and/or the position of streetlamp changes, and thereby the shape of raindrop image does not change greatly, which means the shape of raindrop image can be recognized substantially as a circle shape. Therefore, the processing load of the shape recognition processing for the raindrop 203 can be reduced, and further the recognition precision can be enhanced.

However, if the focus of the capture lens 204 is set at infinity, a tail lamp of the front-running vehicle running at a far distance ahead of the vehicle 100 may be recognized by one or so light receiving elements of the image sensor 206, which means the tail lamp light is received by the one or so light receiving elements. In such a case, the tail lamp light may not be received by a red-light receiving element disposed for receiving the tail lamp color such as red, by which the tail lamp cannot be recognized, and thereby the front-running vehicle cannot be detected. To avoid such situation, the focus of the capture lens 204 is not set at infinity, but preferably set at a point closer to the vehicle 100 compared to infinity. With this setting, the tail lamp of the front-running vehicle running at a far distance ahead of the vehicle 100 can be recognized as an image having out-of-focused or defocused condition, by which the number of the light receiving elements that can receive the light of tail lamp can be increased. Therefore, the recognition precision of the tail lamp can be enhanced, and thereby the detection precision of the front-running vehicle at a far distance ahead of the vehicle 100 can be enhanced.

The light source 202 of the image capturing apparatus 101 can employ, for example, a light emitting diode (LED), a semiconductor laser such as laser diode (LD), or the like. Further, the wavelength of emission light of the light source 202 can employ, for example, visible light, infrared light, or the like. However, the visible light emitted from the light source 202 may cause dazzling of drivers of the oncoming vehicle and pedestrians. Such dazzling can be avoided using light having a wavelength longer than the wavelength of visible light and effectively receivable within the light sensitivity of the image sensor 206. For example, the wavelength of the infrared light having a wavelength range from 800 nm to 1000 nm can be used. In the first example embodiment, the light source 202 emits the light having a wavelength range of the infrared light.

When the image capture device 200 captures the infrared light reflected from the windshield 105, the image sensor 206 of the image capture device 200 receives infrared light emitted from the light source 202, and also ambient light having greater light intensity such as sun light including infrared light. To reduce the effect of the ambient light having greater light intensity to the infrared light coming from the light source 202, the light emission quantity of the light source 202 may be set greater than the light emission quantity of the ambient light. However, it is difficult to devise the light source 202 having the greater light emission quantity.

Figure 6:
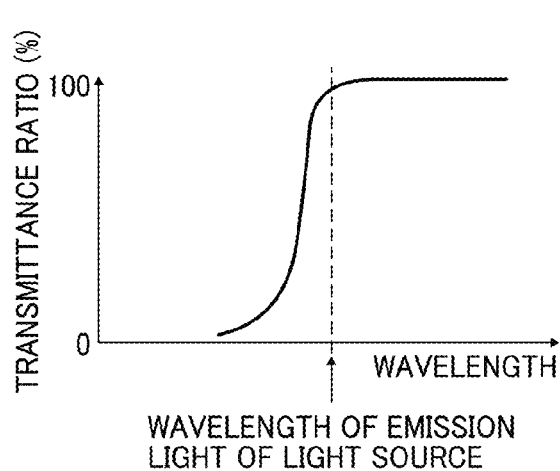
FIG. 6 is an example of a cut-filter that cuts light having a wavelength smaller than a wavelength of emission light of a light source.
Figure 7:
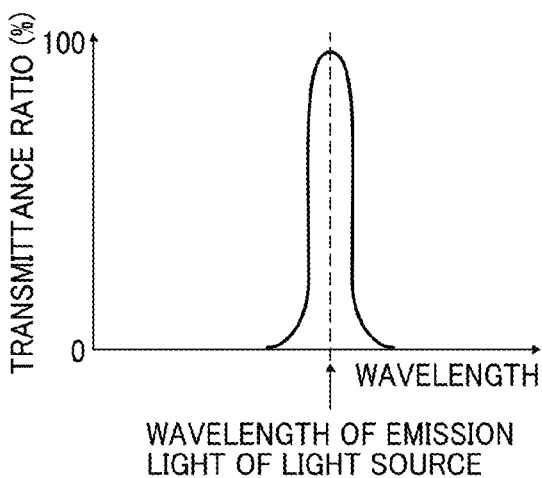
FIG. 7 is an example of a band-pass filter that has a peak of transmittance ratio of light substantially matched to a specific wavelength of light of the light source.

In view of such problem, in the first example embodiment, for example, a suitable cut-filter or a band-pass filter may be used. As illustrated in FIG. 6, a cut-filter that cuts light having a wavelength smaller than a wavelength of emission light of the light source 202, can be used. Further, as illustrated in FIG. 7, a band-pass filter that has a peak of transmittance ratio of light substantially matched to a specific wavelength of light of the light source 202 can be used. With this configuration, the image sensor 206 can effectively receive light emitted from the light source 202 using such filters. By using such filters, the light having a wavelength, which is other than the wavelength of emission light emitted from the light source 202, can be removed. Therefore, the image sensor 206 can receive the light emitted from the light source 202 with quantity relatively greater than the ambient light. Therefore, without using the light source 202 having greater light emission intensity, the light emitted from the light source 202 can be effectively received by the image sensor 206 while reducing the effect of the ambient light.

However, as to the first example embodiment, the raindrop 203 on the windshield 105 is detected based on the captured image data, and further the front-running vehicle and the oncoming vehicle, and the lane (e.g., white line) are also detected based on the captured image data. Therefore, if the light having a given wavelength range, which is other than a wavelength of infrared light emitted from the light source 202, is removed from an entire image, the image sensor 206 cannot receive light having the given wavelength range used for detecting the front-running vehicle/oncoming vehicle and the lane, by which the detection of vehicle/oncoming vehicle and the lane cannot be performed effectively.

In view of such issue, in the first example embodiment, an image area of captured image data is segmented to one detection image area used as a raindrop detection image area, and another detection image area used as a vehicle detection image area. The raindrop detection image area can be used to detect the raindrop 203 on the windshield 105. The vehicle detection image area can be used to detect the front-running vehicle/oncoming vehicle, and the lane (e.g., white line). Therefore, the optical filter 205 is disposed of a sub-filter (hereinafter, raindrop detection filter) that can remove light having a given wavelength band, which is other than infrared light emitted from the light source 202, and the raindrop detection filter is disposed only for the raindrop detection image area. In this configuration, the raindrop detection image area is used to capture image data by disposing the raindrop detection filter, and the vehicle detection image area is used to capture image data without disposing the raindrop detection filter.

Figure 8A:
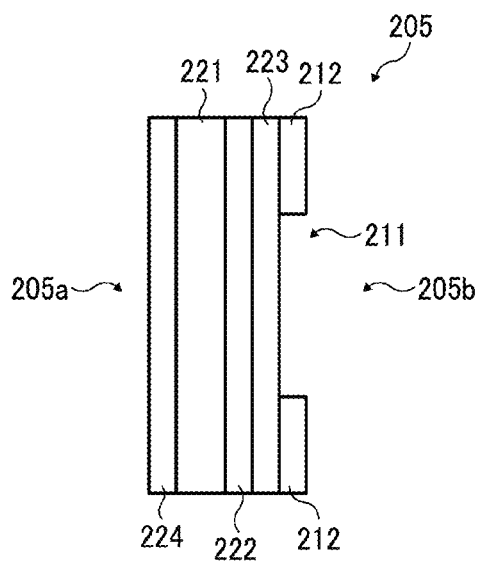
FIG. 8A is a cross-sectional view of an optical filter.

FIG. 8A is a cross-sectional view of the optical filter 205. As illustrated in FIG. 8A, the optical filter 205 includes, for example, a base 221, a spectral filter layer 224, a polarizing filter layer 222, a spin-on-glass (SOG) layer 223, and an infrared transmission filter 212, in which the spectral filter layer 224 is formed on the base 221 at a side 205a (closer to the capture lens 204) to pass through infrared light and visible light, and the polarizing filter layer 222, the SOG layer 223, and the infrared transmission filter 212 (raindrop detection filter) are formed on the base 221 at a side 205b (closer to the image sensor 206).

With employing this configuration forming the filter layers of the optical filter 205 on both faces of the base 221, warping of the optical filter 205 can be reduced, in particular prevented. If these multi-layers are formed on only one face side of the base 221, stress occurs and then warping occurs. However, when the multi-layers are formed on the both faces of the base 221 as illustrated in FIG. 8A, stress occurring to one side can be compensated by stress occurring to the opposite side, with which the warping can be reduced, in particular prevented.

The base 221 is made of translucent materials such as glass, sapphire, rock crystal, which can pass through light such as visible light and infrared light. As to the first example embodiment, the base 221 can be made of glass having high durability with reasonable cost such as vitreous silica, silica glass, quartz glass, fused silica (refractive index of 1.46), heat resistant glass (refractive index of 1.51) such as Tempax (registered trademark) glass or the like.

The spectral filter layer 224, formed at the side 205a of the base 221, is a filter that can pass through a wavelength window of from 400 nm to 670 nm (visible light range) and a wavelength window from 940 nm to 970 nm (infrared light range). The visible light is used to detect information around the vehicle, and the infrared light is used to detect raindrops. Further, the spectral filter layer 224 does not substantially pass through a wavelength window from 700 nm to 940 nm. For example, transmittance of the spectral filter layer 224 is preferably designed to five (5) percent or less for 700 nm to 940 nm because if the light having the wavelength window from 700 nm to 940 nm is included in the received image data, obtained image data becomes red as whole, and it becomes difficult to extract a red portion such as a tail lamp and red-color signs. Therefore, if an infrared cut-filter is formed, other color light that becomes disturbing light can be removed, with which the recognition or detection precision of the tail lamp can be enhanced.

Further, the polarizing filter layer 222, formed at the side 205b of the base 221, can cut S-polarized light and pass only P-polarized light. By disposing the polarizing filter layer 222, disturbance factors and unnecessary reflection light (ghost light) can be cut.

As to the first example embodiment, the polarizing filter layer is a polarizer having a wire grid structure. The wire grid structure is formed by disposing a number of conductive metal wires with a given wire pitch along a given direction. For example, a number of the aluminum wires can be arranged with a given wire pitch along a given direction. By setting the wire pitch of the wire grid structure enough smaller than a wavelength band of the incidence light (e.g., visible light having wavelength of 400 nm to 800 nm) such as one half (½) or less of the wavelength of the incidence light, an electric field vectors of light oscillating in parallel to the long side direction of metal wire can be mostly reflected, and an electric field vectors of light oscillating in perpendicular to the long side direction of metal wire can be mostly passed through, by which the polarizer that can generate single polarization light can be produced.

When the wire grid polarizer is used, it should be noted that the light diminishing ratio increases when the area of cross section of the metal wire increases. Further, when the metal wire has a thickness, which is too great compared to a given interval pitch, the passing ratio of light decreases. Further, if the shape of cross section of the metal wire, perpendicular to the long direction of the metal wire, is a taper shape, the light passing ratio and wavelength dispensability of polarized light become small in a wide range, by which the light diminishing ratio becomes greater. As to the cross-sectional configuration of the wire grid polarizer, when the polarized light polarizing along the groove direction of the wire grid polarizer enters, the wire grid polarizer blocks the polarized light, and when the polarized light polarizing perpendicular to the groove direction of the wire grid polarizer enters, the wire grid polarizer passes through the polarized light.

The polarizing filter layer 222 employing the wire grid structure has following features. The wire grid structure can be formed using known semiconductor manufacturing process. Specifically, a thin film of aluminum is deposited on a base, and then the patterning is performed, and the sub-wavelength convex/concave structure of the wire grid is formed by the metal etching. By using such manufacturing process, the long side direction of metal wire that is the polarization light direction (i.e., polarization axis) can be adjusted with a size of image capture pixel of the image sensor 206 such as several micron (μm) levels, with which transmission polarization axis can be selected with a unit of pixel. Further, since the wire grid structure can be formed of metal such as aluminum having a good level of heat resistance, the wire grid structure can be preferably employed for vehicles As to the first example embodiment, the SOG layer 223 includes a base that can pass through use-range light, and a wire grid structure extending on the base, in which convex portions of the wire grid structure is arranged with a pitch smaller than a wavelength of the use-range light. Further, a filler portion is formed between convex portions of the wire grid structure made of aluminum using inorganic material having a refractive index smaller or equal to the base 221. The filler portion is also formed to cover the convex portions.

Materials used for the SOG layer 223 preferably has a low refractive index closer to the refractive index of "1" of air to prevent degradation of polarization property of the polarizing filter layer 222. For example, porous ceramic materials having tiny holes dispersed in ceramics may be preferably used. Specifically, porous silica ($SiO_2$), porous magnesium fluoride (MgF), or porous alumina ($Al_2O_3$) can be used. The refractive index of porous ceramic materials can be set based on the numbers and size (i.e., porous level) of holes in ceramics. If the main component of the base 221 is rock crystal or glass of silica, porous silica (n=1.22 to 1.26) having the refractive index smaller than the base 221 can be preferably used.

The SOG layer 223 can be formed by using a method of forming an inorganic layer on a base. Specifically, a solution prepared by solving silanol ($Si(OH)_4$) into alcohol is applied on the base using the spin coating method. Then, the solvent is evaporated by applying heat, and the silanol is reacted under the dehydrogenative polymerization reaction process.

Since the polarizing filter layer 222 employs the wire grid structure of a sub-wavelength size, the mechanical strength of the polarizing filter layer 222 is weaker than the mechanical strength of the infrared transmission filter 212 formed on the SOG layer 223. Since the optical filter 205 is preferably contacted closely to the image sensor 206, the optical filter 205 and the image capture pixel face of the image sensor 206 may contact when the optical filter 205 is attached to the image sensor 206. Since the SOG layer 223 protects the polarizing filter layer 222 having a weak mechanical strength, the optical filter 205 can be attached to the image sensor 206 without damages to the wire grid structure. Further, the spectral filter layer 224 can be also protected by the SOG layer 223.

Further, an intrusion of adhering substance to the wire grid structure can be suppressed by disposing the SOG layer 223. Typically, the height of the convex portions of the wire grid structure is a half or less of the use-wavelength. By contrast, the height of the spectral filter layer 224 is one or more times of the use-wavelength, and the greater the thickness of the spectral filter layer 224, the sharper the change of transmittance of the spectral filter layer 224 at the blocking wavelength. Further, the greater the thickness of the SOG layer 223, the harder to secure the flatness of the upper face of the SOG layer 223, and the harder to secure the uniform filling of the filling portions. Therefore, it is not preferable to use the thicker SOG layer. As to the first example embodiment, the polarizing filter layer 222 is covered by the SOG layer 223, and the infrared transmission filter 212 is formed. Therefore, the SOG layer 223 can be formed stably. Further, the infrared transmission filter 212 formed on the SOG layer 223 can be formed with a suitable property setting.

Figure 8B:
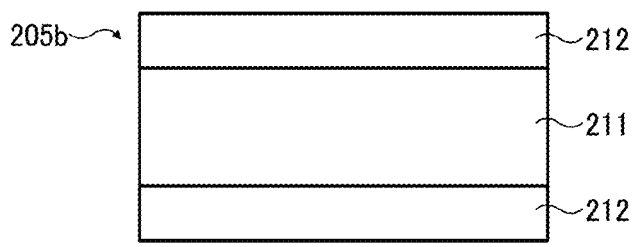
FIG. 8B illustrates a front view of the optical filter viewed from a side closer to an image sensor.
Figure 9:
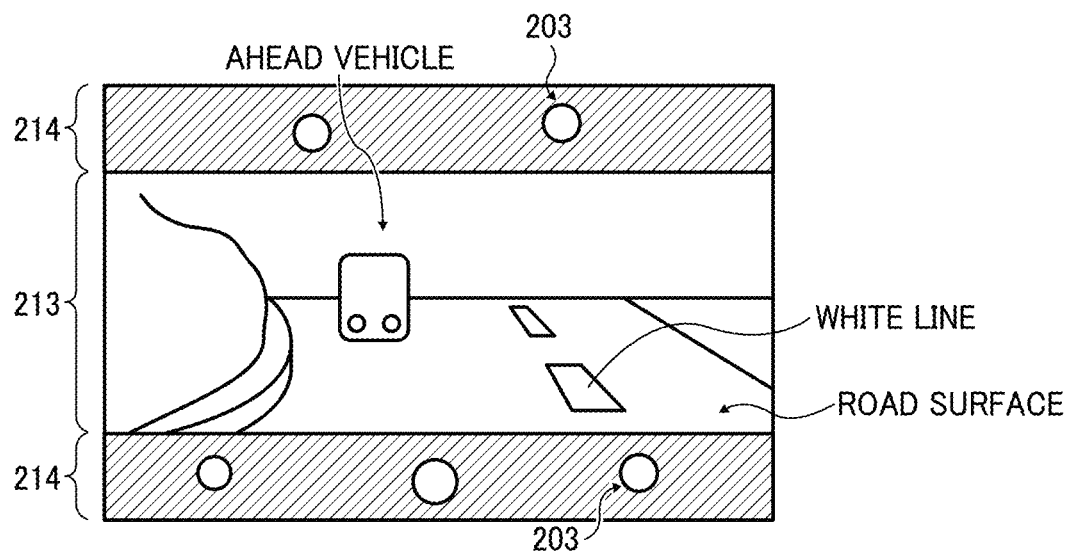
FIG. 9 illustrates an example of an image generated from captured image data.

FIG. 8B illustrates a front view of the optical filter 205 viewed from the side 205b closer to the image sensor 106. FIG. 9 illustrates an example of an image generated from captured image data. As illustrated in FIG. 8B, the optical filter 205 can be segmented into one filter area such as an infrared cut-filter area 211, and another filter area such as an infrared transmission filter 212. For example, the infrared cut-filter area 211 is disposed for a vehicle detection image area 213 that is at a center portion of one image capturing area having a height of a half (²⁄₄) of the image capturing area while the infrared transmission filter 212 is disposed for a raindrop detection image area 214 that is at an upper one-fourth (¼) of one image capturing area and at a lower one-fourth (¼) of one image capturing area. The infrared transmission filter 212 can be devised by using the cut-filter (FIG. 6) or the band-pass filter (FIG. 7).

Typically, an image of headlight of the oncoming vehicle, an image of tail lamp of the front-running vehicle, and an image of the lane (e.g., white line) are present at the center of the image capturing area, an image of road surface, which exists in the front-direction and very close to the vehicle 100, is present at the lower part of the image capturing area, and an image of sky in the front-direction is present at the upper part of the image capturing area, Therefore, information required to recognize or identify the headlight of the oncoming vehicle, the tail lamp of the front-running vehicle, and the lane is present mostly in the center of the image capturing area, and thereby information present in the upper and lower parts of the image capturing area may not be relevant for recognizing the oncoming vehicle, the front-running vehicle, and the lane. Therefore, when an object detection process such as detecting the oncoming vehicle, the front-running vehicle, and the lane, and a raindrop detection are to be performed concurrently based on one captured image data, the upper and lower parts of the image capturing area can be used for the raindrop detection image area 214, and the center of the image capturing area can be used for the vehicle detection image area 213 by disposing the infrared transmission filter 212 as illustrated in FIG. 9.

For example, as to the first example embodiment, the upper part and lower part of the image capturing area can be used as the raindrop detection image area 214, and the center and lower part of the image capturing area can be used as the vehicle detection image area 213. This configuration can preferably shorten a frame time of an image capturing frame used for the raindrop detection because the raindrop detection can be performed by using a smaller part of one image capturing area, and the exposure time for the raindrop detection can be set very short such as several micro seconds (μsec) to several hundreds micro seconds (μsec).

When the image capturing direction of the image capture device 200 is tilted to a downward direction, a hood or bonnet of the vehicle 100 may appear at the lower part of the image capturing area. In such a case, sun light or the tail lamp of the front-running vehicle reflected on the hood of the vehicle 100 becomes ambient light. If the ambient light is included in the captured image data, the headlight of the oncoming vehicle, the tail lamp of the front-running vehicle, and the lane may not be recognized correctly. In the first example embodiment, since the cut-filter (FIG. 6) or the band-pass filter (FIG. 7) can be disposed at a position corresponding to the lower part of the image capturing area, the ambient light such as sun light and the light of tail lamp of the front-running vehicle reflected from the hood can be removed. Therefore, the recognition precision of the headlight of the oncoming vehicle, the tail lamp of the front-running vehicle, and the lane can be enhanced.

The detection of the front-running vehicle can be performed by recognizing the tail lamp of the front-running vehicle in the captured image. Compared to the headlight of the oncoming vehicle, the light quantity of the tail lamp is small. Further, ambient light such as streetlamp or the like may exist in the image capturing area. Therefore, the tail lamp may not be detected with high precision if only the light intensity data is used. To recognize the tail lamp effectively, spectrum information can be used. For example, based on received light quantity of the red-color light, the tail lamp can be recognized effectively. In the first example embodiment, a rear-end filter 220 is disposed for the optical filter 205 using a red-color filter or cyan-color filter matched to a color of the tail lamp, which is a filter that can pass through only a wavelength band matched to a color used for the tail lamp, so that the received light quantity of the red-color light can be detected effectively.

However, each of the light receiving elements composing the image sensor 206 may have sensitivity set to infrared light. Therefore, if the image sensor 206 receives light including infrared light, the captured image may become red-color-like image as a whole. Then, it may become difficult to recognize a red-color image portion corresponding to the tail lamp. In view of such situation, in the first example embodiment, a front-end filter 210 is disposed for the optical filter 205, in which the infrared cut-filter area 211 corresponding to the vehicle detection image area 213 is disposed. By employing such infrared cut-filter area 211, the infrared wavelength band can be removed from the captured image data used for the recognition of the tail lamp, by which the recognition precision of tail lamp can be enhanced.

Figure 10:
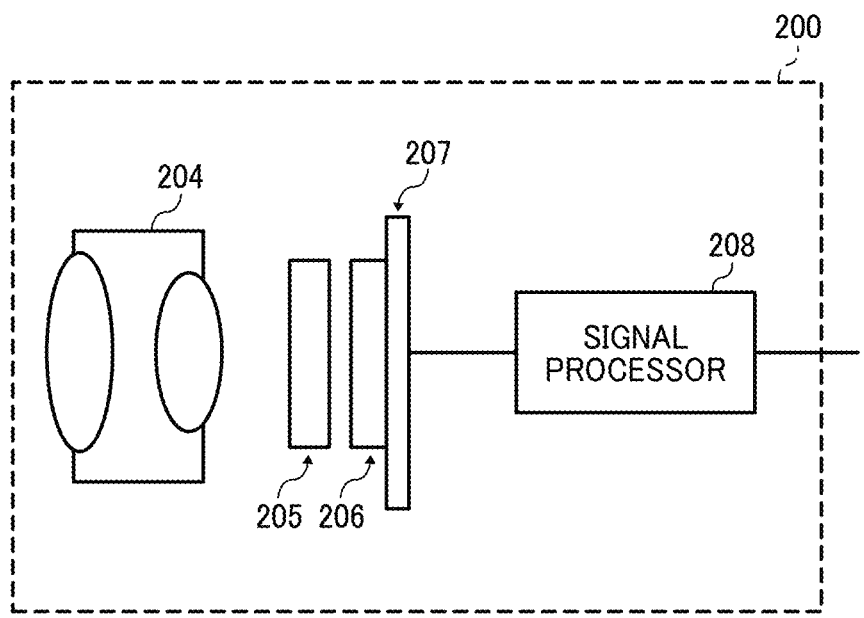
FIG. 10 illustrates a schematic configuration of an image capture device of the first example embodiment.

FIG. 10 illustrates a schematic configuration of the image capture device 200 of the first example embodiment. The image capture device 200 includes, for example, the capture lens 204, the optical filter 205, a sensor board 207, and a signal processor 208. The sensor board 207 is disposed with the image sensor 206 composed of a two-dimensional pixel array configured by arraying a number of light receiving elements in two dimensional directions. Each of light receiving elements of the image sensor 206 receives light having a given intensity or quantity, and the sensor board 207 outputs analog electrical signals corresponding to the received light intensity or quantity to the signal processor 208. Upon receiving the analog electrical signals, the signal processor 208 converts the analog electrical signals to digital electrical signals to generate and output the captured image data. Light coming from the image capturing area including one or more objects (detection-target object) passes the capture lens 204 and the optical filter 205, and then the image sensor 206 converts the received light to electrical signals based on the light intensity. When the signal processor 208 receives electrical signals such as analog signals output from the image sensor 206, the signal processor 208 converts the analog signals to digital signals including brightness or intensity data of each pixel on the image sensor 206 as the captured image data. The signal processor 208 outputs the captured image data to a later stage unit with horizontal/vertical synchronization signals of image.

Figure 11:
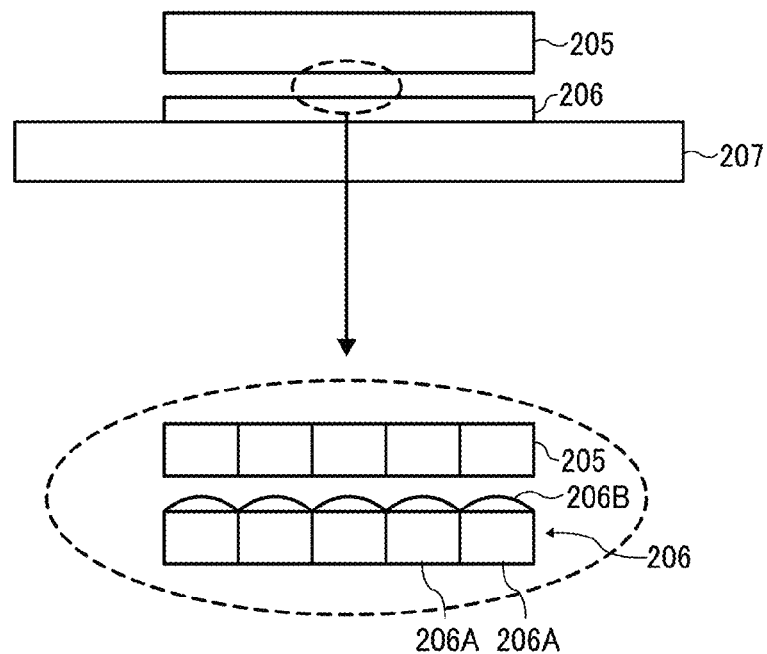
FIG. 11 illustrates a schematic configuration of the optical filter and the image sensor of the image capturing device viewed from a direction perpendicular to light passing or propagation direction.

FIG. 11 illustrates a schematic configuration of the optical filter 205 and the image sensor 206, viewed from a direction perpendicular to the light passing direction. Specifically, the image sensor 206 is a sensor employing, for example, a charge coupled device (CCD), a complementary metal oxide semiconductor (CMOS), or the like, and each of the light receiving elements of image sensor 206 is, for example, a photodiode 206A. The photodiodes 206A are arrayed as a two-dimensional array, in which each one of the photodiodes 206A corresponds to each one pixel. To enhance the light collection efficiency of the photodiode 206A, a micro lens 206B is disposed at the incidence side of the photodiode 206A. The image sensor 206 can be bonded to a printed wiring board (PWB) using known methods such as wire bonding to configure the sensor board 207. Hereinafter, the photodiode 206A may mean one photodiode or a plurality of photodiodes, and the photodiode 206A can be used as the light receiving element of the image sensor 206.

The image sensor 206 can be exposed by light using known exposure methods such as a global shutter method and a rolling shutter method. As to the global shutter method, light is received by all of the light receiving elements (photodiodes 206A) simultaneously (simultaneous exposure) and signals are read from each one of the light receiving elements (photodiodes 206A). As to the rolling shutter method, light is received by one line composed of a given number of light receiving elements (photodiodes 206A) and then received by another one line composed of a given number of light receiving elements (photodiodes 206A) sequentially (line-by-line exposure), and signals are read from each one of the light receiving elements (photodiodes 206A). The first example embodiment employs, for example, the rolling shutter method.

For example, the optical filter 205 and the image sensor 206 can be bonded, for example, using an ultra violet (UV) bonding agent, or the optical filter 205 and the image sensor 206 can be supported with each other by a spacer disposed therebetween at non-pixel areas not used for image capturing, and four sides of the optical filter 205 and the image sensor 206 can be bonded by UV bonding or heat bonding. By contacting the optical filter 205 and the image sensor 206 tightly, a boundary of the raindrop detection image area 214 and the vehicle detection image area 213 can be set clearly, with which the precision of raindrop detection can be enhanced.

In the first example embodiment, the adhering substance detection is performed to control operations of the wiper 107 and washer. The adhered substance is, for example, raindrop, bird droppings, splash (spray of water raised by other vehicles) or the like.

Figure 12:
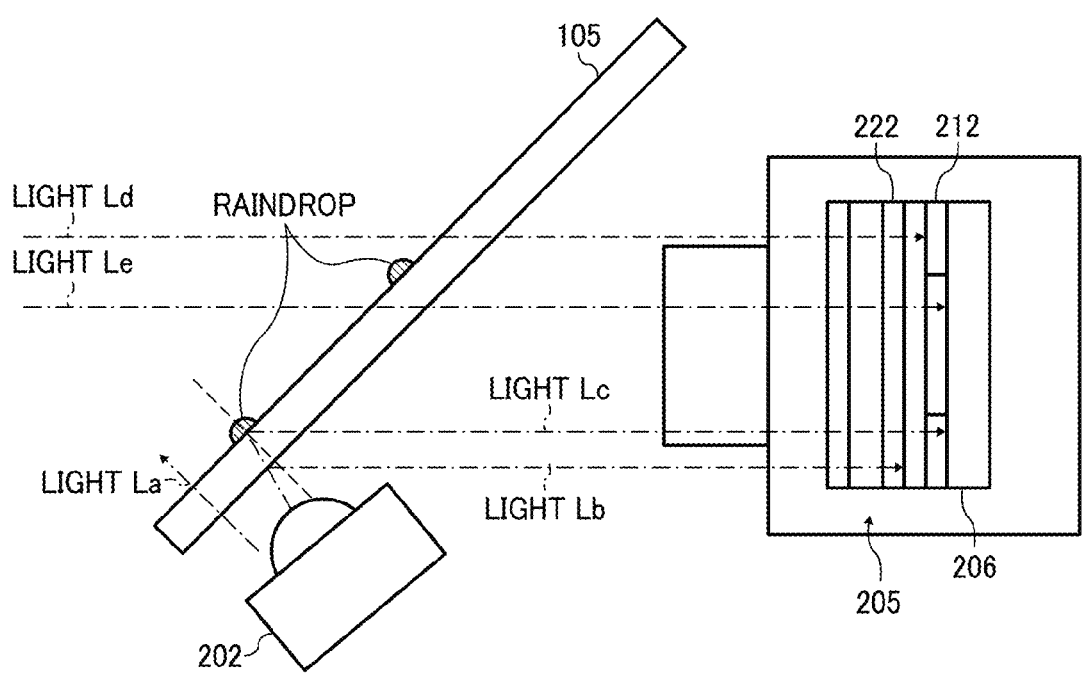
FIG. 12 illustrates a schematic configuration of the image capture device and the light source, and light used for the adhering substance detection such as raindrop detection.

FIG. 12 illustrates a schematic configuration of the image capture device 200 and the light source 202, and light used for the adhering substance detection such as raindrop detection. The light source 202 is disposed at a given position so that a direction of regular light reflected at the outer face of the windshield 105 can be substantially aligned to the optical axis of the capture lens 204. Light La to Le receive-able by the image capture device 200 are described with reference to FIG. 12.

(Light La)

Light La is a light beam emitted from the light source 202 and then passes through the windshield 105 as illustrated in FIG. 12. When the raindrop 203 does not adhere on the outer face of the windshield 105, the light beam emitted from the light source 202 and entering the windshield 105 passes through the windshield 105s and goes out of the windshield 105 as indicated in FIG. 12. The light La may enter human eyes, which may cause injury. Therefore, the light source 202 may preferably employ a light source having a given wavelength and light intensity that does not cause eye injury even if the light beam enters human eyes (eye-safe light). Further, if the light source 202 is positioned as illustrated in FIG. 12, the light beam entering the windshield 105 goes upward in the vertical direction, by which the probability of light-hitting of human eyes can be preferably reduced.

(Light Lb)

Light Lb is a light beam emitted from the light source 202 and reflected regularly on the inner face of the windshield 105 and then entering the image capture device 200. The light Lb has polarization light components composed of mostly S-polarized light component. The light Lb is not necessary for the raindrop detection, and further the light Lb becomes ambient light that degrades the detection precision of the raindrop detection. In the first example configuration, the light Lb (S-polarized light component) can be cut by the polarizing filter layer 222 of the optical filter 205. Therefore, the deterioration of detection precision of raindrop detection due to the light Lb can be reduced, suppressed, or prevented.

(Light Lc)

Light Lc is a light beam emitted from the light source 202 and entering and then passing through the inner face of the windshield 105 without reflection at the inner face of the windshield 105, and reflecting in a raindrop on the outer face of the windshield 105 and passing through the inner face of the windshield 105 again, and then entering the image sensor 206 of the image capture device 200. When a raindrop adheres on the outer face of the windshield 105, the light Lc that has entered the windshield 105 reflects inside the raindrop for a plurality of times, and then goes through the windshield 105 toward the image capture device 200, and then reaches the optical filter 205 of the image capture device 200. The light Lc passing through the windshield 105 includes P-polarized light component greater than S-polarized light component. The light Lc passes through the spectral filter layer 224 and then also passes through the polarizing filter layer 222 because the polarizing filter layer 222 employs a wire-grid structure having grooves that can pass through the P-polarized light component. The optical filter 205 of the image capture device 200 includes the infrared transmission filter 212 configured to pass through light having a wavelength of light (e.g., infrared light) emitted from the light source 202. The light Lc also passes through the infrared transmission filter 212 and reaches the image sensors 206, and the raindrop detection can be performed using the light received by the image sensor 206.

(Light Ld)

Light Ld is a light beam coming from the outside of the windshield 105 and passing through the windshield 105, and then entering a part of the image sensor 206 used for the raindrop detection image area 214. The light Ld may become ambient light when to perform the raindrop detection, but most of the light components having a given wavelength range included in the light Ld can be cut by the infrared transmission filter 212 disposed for the optical filter 205. Therefore, disturbance ambient light coming from the outside of the windshield 105 can be cut and thereby cannot reach the raindrop detection image area 214.

(Light Le)

Light Le is a light beam coming from the outside of the windshield 105 and passing through the windshield 105, and then entering a part of the optical filer 205 used for the vehicle detection image area 213 where the infrared transmission filter 212 is not disposed, which means the light Le passes an image area other than the raindrop detection image area 214. The light Le including visible light and infrared light can pass through the optical filer 205, in which only the P-polarized light can be received by the image sensor 206 while blocking other unnecessary light by the optical filer 205. The captured image data can be detected as signals used for various applications such as detecting the headlight of the oncoming vehicle, the tail lamp of the front-running vehicle, and the lane (e.g., white line).

As to the light source 202, the angle of incident light emitted from the light source 202 and entering the windshield 105 is set to an angle that reflection light reflected at a boundary face of a raindrop and air can be captured by the image capture device 200 (see light Lc in FIG. 12). As illustrated in FIG. 12, the intensity of reflection light reflected from the raindrop can become the greatest intensity when the light source 202 is disposed at a position substantially opposite to the light axis of the image capture device 200 with respect to the normal line of the windshield 105, or when the light axis of the light source 202 and the light axis of the image capture device 200 are set on the substantially same line. The intensity of reflection light reflected from the raindrop can become the smallest intensity when the normal line of the windshield 105 and the light axis of the light source 202 are aligned.

Further, the light source 202 can be disposed at a position that can irradiate light only to an area of the infrared transmission filter 212, with which a noise component from the vehicle detection image area 213 can be avoided. Further, the light source 202 can be disposed with a plurality of light sources 202. In this case, a polarizer pattern for each of areas of the polarizing filter layer 222 can be set a pattern that can pass through only a polarization light parallel to a face defined by the light axis of light emitted from one light source 202 to the windshield 105, emitting the greatest incident light intensity to the polarizer pattern, and the light axis of the capture lens 204.

The light emission of the light source 202 can employ a continuous emission method known as CW light emission or a pulse emission method that emits light with a specific time interval repeatedly. By synchronizing the light emission timing and image capturing timing, an effect of disturbance ambient light can be further reduced. When the plurality of the light sources 202 is disposed, the plurality of the light sources 202 can emit light simultaneously or sequentially. When the plurality of the light sources 202 emits light sequentially, an effect of disturbance ambient light can be further reduced by synchronizing the light emission timing and image capturing timing.

FIG. 13 and FIG. 14 show experiment results of images captured by the inventors. FIG. 13 is an experiment result when raindrops adhered, and FIG. 14 is an experiment result when no raindrops adhered, in which the lower part of image area is used as the raindrop detection image area 214.

FIG. 15 shows expanded views of images captured for the raindrop detection image area 214 by differentiating the amount of raindrop. When standard deviation of luminance of the captured images of FIG. 15 is computed, the standard deviation of luminance respectively becomes "20, 27, and 39" from left to right images of FIG. 15, and it is found that the standard deviation of luminance and the amount of raindrop have a correlation. Therefore, as to the first example embodiment, the image analyzer 102 computes values of the standard deviation of luminance for images captured for the raindrop detection image area 214, and measures the amount of raindrop based on the standard deviation of luminance. Further, instead of the standard deviation, variance can be used to measure the amount of raindrop.

A description is given of an image capturing operation of the image capture device 200 of the first example embodiment. The image capture device 200 captures object recognition frames and raindrop detection frames separately. The object recognition frames can be captured by receiving light (second light) coming from an area ahead of the vehicle 100. The object recognition frame is captured to obtain an image for an object recognition image area 213 used for recognizing one or more objects existing at the area ahead of the vehicle 100 (e.g., other vehicles, lanes, road surface, persons, obstacles). The raindrop detection frames can be captured by emitting light (first light) from the light source 202 to the windshield 105 and receiving light reflected from the windshield 105. The raindrop detection frame is captured to obtain an image for a raindrop detection image area 214 used for detecting raindrops adhering on the windshield 105. Specifically, one raindrop detection frame is captured after the object recognition frame is captured for a plurality of frames. The capturing of the raindrop detection frame and the object recognition frames are repeatedly performed as an image capturing operation.

FIG. 16 is a timing chart of the image capturing operation of a comparison example. FIG. 16 shows frame synchronization signals, line reading signals, frame numbers, exposure periods arranged along the same time line. As to the exposure period, the vertical direction corresponds to a position of each of light receiving element lines composing the image sensor 206. The received-light quantity of each of the light receiving elements of the image sensor 206 can be read and output for each of the light receiving elements when the corresponding line reading signal is read.

FIG. 17A indicates a relationship of data reading timing and exposure period for the sensing frames employing the rolling shutter method. FIG. 17B indicates a relationship of data reading timing and exposure period for the raindrop detection frames employing the rolling shutter method. The first example embodiment and also the comparison example employ the rolling shutter method. As illustrated in FIG. 17A, as to the sensing frames, each timing of the line reading signal (horizontal synchronization signal) of each of the light receiving element lines "..., N, N+1, N+2, ..." of the image sensor 206 is used as reference, in which the light-receiving start time, set based on the exposure time, is shifted for each of the light receiving element lines. As illustrated in FIG. 17B, as to the raindrop detection frame, each timing of the line reading signal (horizontal synchronization signal) of each of the light receiving element lines "..., M, M+1, M+2, ..." of the image sensor 206 is used as reference, in which the light-receiving start time, set based on the exposure time, is shifted for each of the light receiving element lines.

As to the first example embodiment and the comparison example, the image capturing operation is performed repeatedly as follows. Specifically, the sensing frames such as four object recognition frames B0 to A3 for acquiring images for the vehicle detection image area 213, and the raindrop detection frame such as one adhering detection frame R4 for acquiring an image for the raindrop detection image area 214 are captured sequentially, and this sequential capturing of the sensing frames and the raindrop detection frame are performed repeatedly.

In this description, an image capturing frame having a frame number B0 is a sensing frame used for a lane-keep control, which is known as Lane Departure Warning (LDW). The image capturing frame B0 corresponds to an automatic exposure frame, to which the exposure time during the image capturing operation is automatically controlled within a given time range. Specifically, a shorter exposure time is set for bright environment such as daytime, and a longer exposure time is set for dark environment such as night. The image capturing frame B0 is also referred as the sensing frame B0.

In this description, an image capturing frame having a frame number A1 is a sensing frame used for a light control of the headlight 104, which is known as Auto High Beam (AHB). The image capturing frame A1 corresponds to a locked-exposure frame, to which the exposure time during the image capturing operation is locked to a given value. The image capturing frame A1 is also referred as the sensing frame A1.

In this description, an image capturing frame having a frame number B2 is a sensing frame used for a collision-avoiding control, which is known as Front Collision Warning (FCW). The image capturing frame B2 corresponds to an automatic exposure frame, to which the exposure time during the image capturing operation is automatically controlled within a given time range. The image capturing frame B2 is also referred as the sensing frame B2.

In this description, an image capturing frame having a frame number A3 is a sensing frame used for a light control of the headlight 104 same as the image capturing frame A1 (second frame in FIG. 16). The image capturing frame A3 corresponds to a locked-exposure frame, to which the exposure time during the image capturing operation is locked to a given value. The image capturing frame A3 is also referred as the sensing frame A3.

In this description, an image capturing frame having a frame number R4 is a raindrop detection frame used for a drive control of the wiper 107. The image capturing frame R4 corresponds to a locked-exposure frame, to which the exposure time during the image capturing operation is locked to very short time such as several micro seconds (μsec) to several hundreds micro seconds (μsec). The raindrop detection frame used for acquiring an image of the raindrop detection image area 214 receives relatively strong light (high intensity light) from the light source 202. Therefore, a signal output from the image sensor 206 is saturated when the image sensor 206 receives the strong light. Therefore, the exposure time is preferably shortened as much as possible to prevent saturation of the signal output from the image sensor 206, and also to reduce the effect of ambient light not coming from the light source 202. Further, since the light intensity or quantity from the light source 202 is almost constant, the locked exposure time can be used for the image capturing frame R4.

As to the first example embodiment and the comparison example, the image capturing operation is performed by capturing the sensing frames such as B0 to A3 for a given times (e.g., seven times), and then capturing one raindrop detection frame R4, and this image capturing operation is repeatedly performed.

As to the first example embodiment and the comparison example, as illustrated in FIG. 16, a frame time Rt of the raindrop detection frame R4 is set shorter than a frame time Ft of the sensing frame such as B0 to A3. Since the raindrop detection frame R4 receives the strong light from the light source 202 as above described, the exposure time for the raindrop detection frame R4 is set very shorter than the exposure time of the sensing frames B0 to A3, and thereby the frame time Rt of the raindrop detection frame R4 can be set shorter than the frame time Ft of the sensing frames B0 to A3. Further, as to the first example embodiment, the number of the light receiving element lines corresponded to the raindrop detection image area 214, used for capturing the raindrop detection frame R4, is set smaller than the number of the light receiving element lines corresponded to the vehicle detection image area 213, used for capturing the sensing frames B0 to A3. Since the light receiving element lines of the image sensor 206 used for capturing an image of the raindrop detection frame R4 can be corresponded to the upper part of the image capturing area, which can be read at first among the light receiving element lines of the image sensor 206, the frame time Rt of the raindrop detection frame R4 can be set very shorter than the frame time Ft of the sensing frames B0 to A3.

However, as to the comparison example, the sensing frame B0 right after the raindrop detection frame R4 is the automatic exposure frame, which receives the automatic exposure control. Therefore, if an image of the sensing frame B0 is captured under dark environment such as in a tunnel or night, as illustrated in FIG. 16, the exposure time of the sensing frame B0 is set longer, and the light-receiving start time at each of the light receiving element lines used for the sensing frame B0 becomes earlier. Since the frame time Rt of the raindrop detection frame R4 is set shorter, and the exposure time of the sensing frame B0 right after the raindrop detection frame R4 is set longer, the exposure period ER4 of the raindrop detection frame R4 may be overlapped by the exposure period EB0 of the sensing frame B0 right after the raindrop detection frame R4 as illustrated in FIG. 16. If this overlapping occurs, received-light quantity data cannot be correctly acquired for at least one of the raindrop detection frame R4 and the sensing frame B0 right after the raindrop detection frame R4.

Example Configuration 1 of Image Capturing Operation

Figure 18:
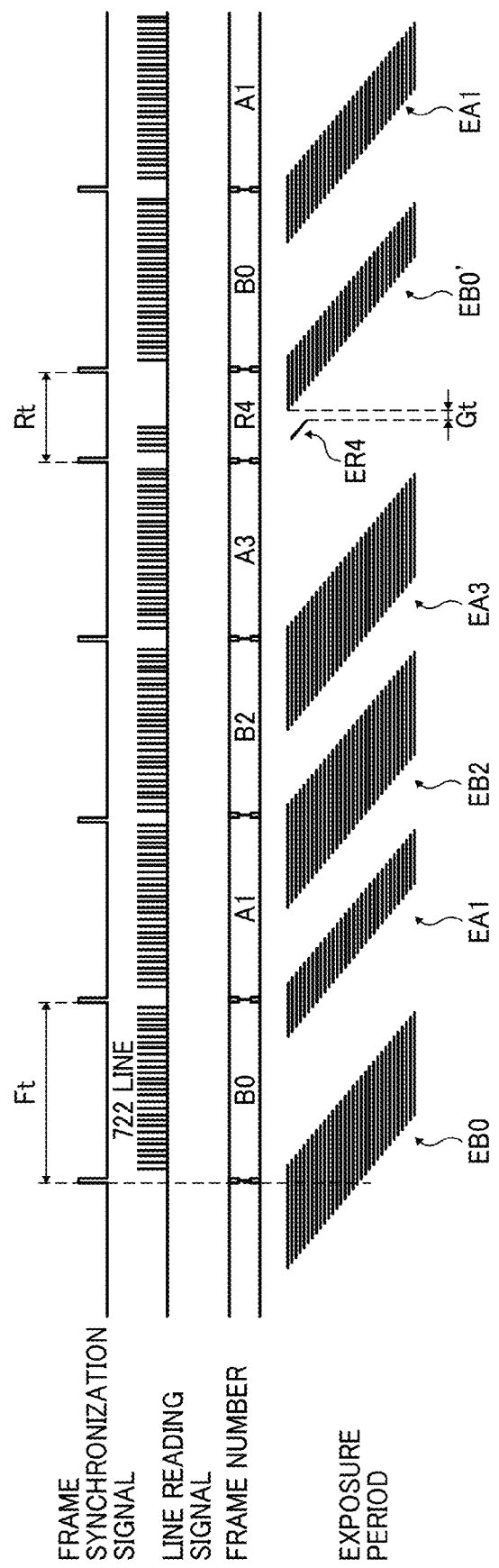
FIG. 18 is one example of a timing chart of an image capturing operation of the first example embodiment.

FIG. 18 is one example of a timing chart of the image capturing operation of the first example embodiment. Specifically, a upper limit of the exposure time of the sensing frame B0 right after the raindrop detection frame R4, which can be changed by the automatic exposure control, is set to a given value or less so that the exposure period ER4 of the raindrop detection frame R4 is not overlapped by the exposure period EB0' of the sensing frame B0. Therefore, even under dark environment such as in the tunnel or night, the exposure controller 109 does not set a value greater than the upper limit to the exposure time of the sensing frame B0. Therefore, as illustrated in FIG. 18, the exposure period ER4 of the raindrop detection frame R4 is not overlapped by the exposure period EB0' of the sensing frame B0.

As to the first example embodiment, since light is emitted from the light source 202, the exposure period ER4 of the raindrop detection frame R4 can be set with a given margin to prevent the effect of light emitted from the light source 202 to the sensing frame B0 right after the raindrop detection frame R4. Specifically, a given blank time period Gt can be set between the end of the exposure period ER4 of the raindrop detection frame R4 (i.e., timing of a line reading signal for a line to be read as the last line) and the start of the exposure period EB0' of the sensing frame B0 right after the raindrop detection frame R4 (i.e., timing of a line reading signal for a line to be read as the first line).

As to the sensing frame B0 not right after the raindrop detection frame R4, the upper limit of the exposure time of the sensing frame B0, which can be changed by the automatic exposure control, has no limitations. Therefore, as to the first example embodiment, the exposure time of the sensing frame B0 not right after the raindrop detection frame R4 can be set with a longer time without the upper limit under dark environment as illustrated in FIG. 18. Therefore, under dark environment, the exposure time EB0' of the sensing frame B0 right after the raindrop detection frame R4 and the exposure time EB0 of the sensing frame B0 not right after the raindrop detection frame R4 become different. If the exposure time becomes different between the same type frames such as the sensing frame B0, the received-light quantity differs between the same type frames such as the sensing frame B0, and thereby the recognition precision of lane may deteriorate.

In view of this issue of different exposure time, as to the first example embodiment, the image analyzer 102 can be used as an image converter that performs an image conversion if the exposure time EB0 of the sensing frame B0 not right after the raindrop detection frame R4 is set greater than the upper limit. Specifically, the image analyzer 102 converts an image captured for the sensing frame B0 right after the raindrop detection frame R4 to a corrected image based on the exposure time EB0 of the sensing frame B0 not right after the raindrop detection frame R4, which is set greater than the upper limit. Specifically, a signal value (received-light quantity) output from the image sensor 206 for the sensing frame B0 right after the raindrop detection frame R4 is increased based on a difference between the exposure time EB0' of the sensing frame B0 right after the raindrop detection frame R4 and the exposure time EB0 (i.e., greater than the upper limit) of the sensing frame B0 not after the raindrop detection frame R4. With this configuration, the difference of signal values (received-light quantity) caused by different exposure time between the sensing frames B0 can be reduced, with which the deterioration of lane recognition precision can be suppressed.

Example Configuration 2 of Image Capturing Operation

As to the first example embodiment, the upper limit of the exposure time, controlled by the automatic exposure control, is limited to a given value for the sensing frame B0 right after the raindrop detection frame R4 in the example configuration 1. Further, other configuration (example configuration 2) can be used to prevent the overlapping of the exposure period ER4 of the raindrop detection frame R4 and the exposure period EB0' of the sensing frame B0 right after the raindrop detection frame R4. Specifically, the automatic exposure control is not performed to the sensing frame B0 right after the raindrop detection frame R4 but a locked exposure time is set for the sensing frame B0 right after the raindrop detection frame R4. This locked exposure time is set to a given value or less so that the exposure period ER4 of the raindrop detection frame R4 is not overlapped by the exposure period EB0' of the sensing frame B0 right after the raindrop detection frame R4.

In this example configuration 2, the exposure time becomes different between the same type frames such as the sensing frames B0. Therefore, it is preferable to convert an image captured for the sensing frame B0 right after the raindrop detection frame R4 by setting the locked exposure time to a corrected image based on the exposure time EB0 of the sensing frame B0 not right after the raindrop detection frame R4 controlled by the automatic exposure control.

Example Configuration 3 of Image Capturing Operation

Figure 19:
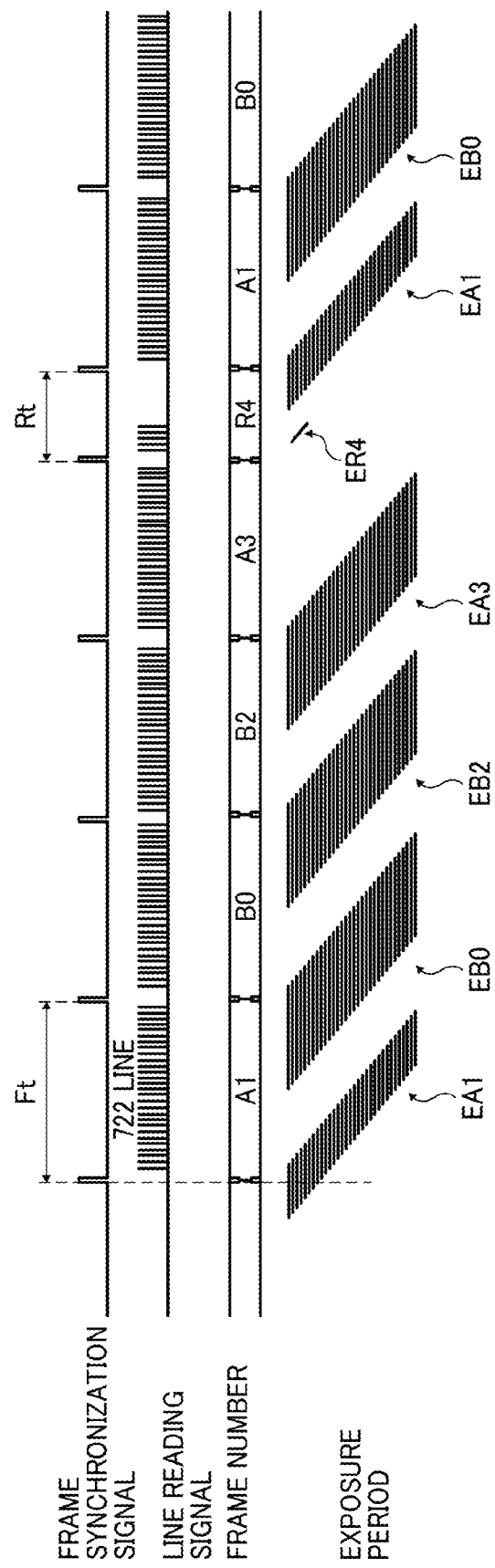
FIG. 19 is another example of a timing chart of an image capturing operation of the first example embodiment.

Further, other configuration (example configuration 3) can be used to prevent the overlapping of the exposure period EB0' of the sensing frame B0 and the exposure period ER4 of the raindrop detection frame R4 as illustrated in FIG. 19. In this example configuration 3, as illustrated in FIG. 19, a position of the sensing frame B0 used for the LDW (Lane Departure Warning) and a position of the sensing frame A1 used for the AHB (Auto High Beam) control of the headlight 104 are switched, in which the sensing frame A1 set with the locked exposure time is positioned right after the raindrop detection frame R4. This locked exposure time can be set to a given value or less so that the exposure period ER4 of the raindrop detection frame R4 is not overlapped by the exposure period EA1 of the sensing frame A1.

In this example configuration 3, the exposure time between the same type frames such as the sensing frames A1 can be set to the same exposure time, which means the exposure time between the same type frames such as the sensing frames A1 do not become different. Therefore, the above described image conversion is not required for the example configuration 3.

A description is given of a light emission control of the light source 202 of the first example embodiment. When an image is captured for the raindrop detection frame R4, the image can be captured by using the raindrop detection image area 214 alone. Therefore, when image data of the raindrop detection frame R4 is read, the image data is read from lines of the light receiving elements of the image sensor 206 (hereinafter, light receiving element lines of the image sensor 206) corresponded to the raindrop detection image area 214, which means the light receiving element lines of the image sensor 206 corresponded to the upper part of the image capturing area are used to capture the image data for the raindrop detection frame R4. Therefore, when the image data is captured for the raindrop detection frame R4, the time period of emitting light from the light source 202 can be set to a value matched to the exposure period of the light receiving element lines of the image sensor 206 corresponded to the raindrop detection image area 214.

During the time period emitting light from the light source 202, the light emitted from the light source 202 may also enter a part of the image sensor 206 used for the vehicle detection image area 213, and becomes disturbance ambient light for the vehicle detection image area 213. Therefore, the light emission control of the light source 202 is performed to emit the light from the light source 202 only for the exposure period of the light receiving element lines of the image sensor 206 corresponded to the raindrop detection image area 214. With this configuration, under a condition that the frame time of the raindrop detection frame R4 is set short, the light emitted light from the light source 202 does not become disturbance ambient light for the sensing frames A3 and B0, which are right before and after the raindrop detection frame R4.

Figure 20:
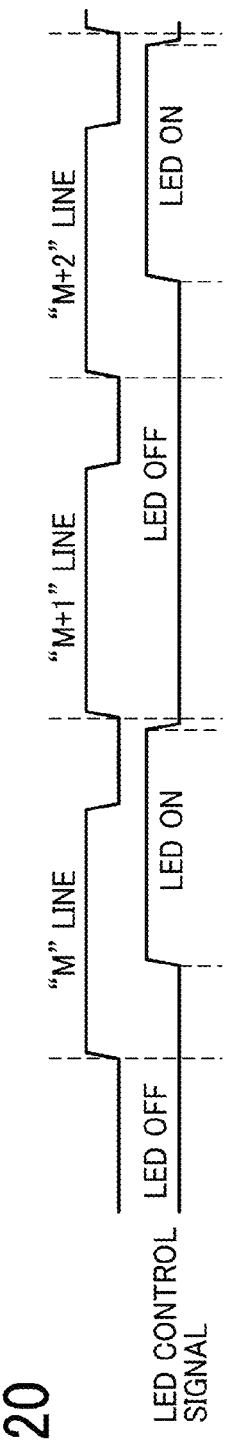
FIG. 20 is an example of a timing chart of line reading signals for the raindrop detection frame and light emission timing of the light source.

FIG. 20 is an example of a timing chart of line reading signals for the raindrop detection frame R4 and the light emission timing of the light source 202. When an image is captured for the raindrop detection frame R4, the light source 202 can be controlled to emit light continuously for the exposure period of the light receiving element lines of the image sensor 206 corresponded to the raindrop detection image area 214. In this configuration, image data can be acquired for the light receiving element lines of the image sensor 206 corresponded to the raindrop detection image area 214 under a condition that the light source 202 emits light to all of the light receiving element lines of the image sensor 206 corresponded to the raindrop detection image area 214. However, if ambient light other than the light emitted from the light source 202 enters the image sensor 206, the image data captured by the image sensor 206 includes an error corresponding to the ambient light component.

Figure 21:
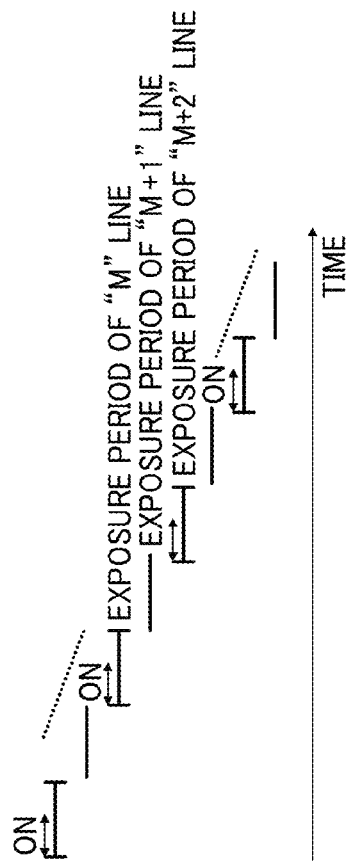
FIG. 21 is an example of a light emission timing of the light source during an exposure period of each line.
Figure 22:
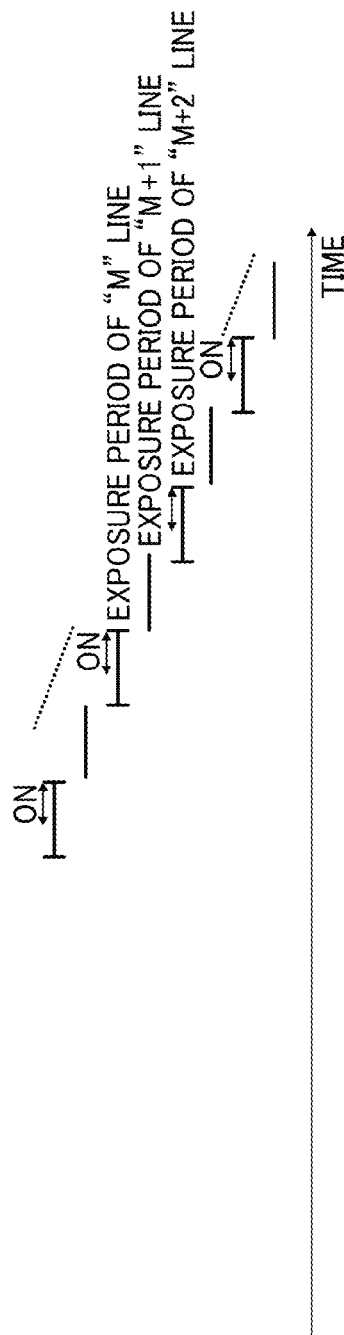
FIG. 22 is another example of a light emission timing of the light source during an exposure period of each line.

Therefore, as to the first example embodiment, when capturing an image for one raindrop detection frame R4, the light mission control of the light source 202 is performed by setting at least one light-ON time of the light source 202, and one light-OFF time of the light source 202 during the exposure period of the light receiving element lines of the image sensor 206 corresponded to the raindrop detection image area 214. For example, as to the first example embodiment, the light emission control of the light source 202 is performed by setting the light-ON time of the light source 202 for one line, and the light-OFF time of the light source 202 for the next one line, and so on. Further, the light emission control of the light source 202 can be performed by setting the light-ON time of the light source 202 for two lines, and the light-OFF time of the light source 202 for the next two lines, and so on. The light emission timing of the light source 202 for each of the light receiving element lines of the image sensor 206 during the exposure period of the light source 202 can be set at a start timing of the exposure period of each line as illustrated in FIG. 21, or an end timing of the exposure period of each line as illustrated in FIG. 22.

A description is given of an experiment conducted by the inventors. In the experiment, similar to the first example embodiment, the light emission control of the light source 202 was performed by setting the light-ON time of the light source 202 for one light receiving element line, and the light-OFF time of the light source 202 for the next one light receiving element line for a plurality of light receiving element lines to check whether the raindrop detection can be performed effectively.

Figure 23:
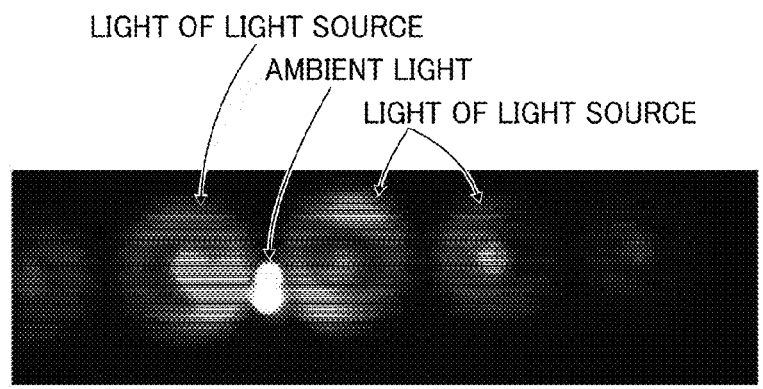
FIG. 23 is an example of image of the raindrop detection image area 214 captured for the experiment, in which the light source 202 was turned ON while ambient light enters.
Figure 24:
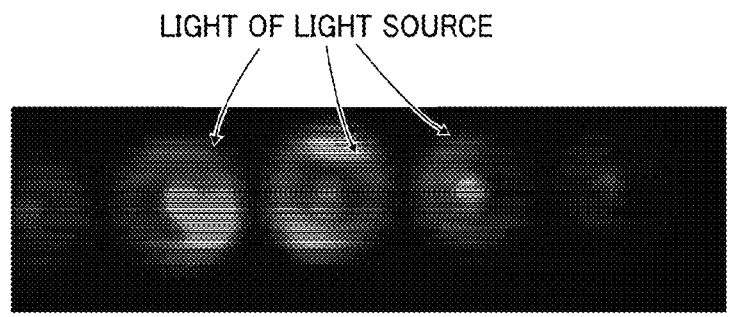
FIG. 24 is an example of image of the raindrop detection image area 214 captured for an experiment, in which the light source 202 was turned ON while ambient light did not enter.
Figure 25:
FIG. 25 is an expanded view of the image of FIG. 23 corresponding to an image portion where light emitted from the light source was captured.

FIG. 23 is an example of image of the raindrop detection image area 214 captured for the experiment, in which the light source 202 was turned ON while ambient light entered. FIG. 24 is an example of image of the raindrop detection image area 214 captured for an experiment, in which the light source 202 was turned ON while ambient light did not enter. FIG. 25 is an expanded view of the image of FIG. 23 corresponding to the image portion where the light emitted from the light source 202 was captured. As illustrated in FIG. 25, a high contrast can be obtained for each of light receiving element lines based on the light-ON time of the light source 202 for one light receiving element line, and the light-OFF time of the light source 202 for the next one light receiving element line.

Second Example Embodiment

A description is given of another device control system to control vehicle-mounted devices employing an image capturing apparatus according to a second example embodiment. The second example embodiment employs a configuration almost same as the configuration of the first example embodiment except some parts of the image capturing apparatus 101. Therefore, different points of the second example embodiment is explained.

FIG. 26 is a schematic configuration of an image capturing apparatus 101a of the second example embodiment that includes a prism 230, used as a reflective diffraction member, disposed on the inner face of the windshield 105. As to the image capturing apparatus 101a of the second example embodiment, as illustrated in FIG. 26, light L emitted from the light source 202 enters the prism 230 disposed on the inner face of the windshield 105, reflects totally on the outer face of the windshield 105 and enters the capture lens 204, and then the reflection light is received by the image sensor 206 disposed on the sensor board 207.

By contrast, the light L emitted from the light source 202 passes through the outer face of the windshield 105 when the light L enters a portion of the outer face of the windshield 105 where a raindrop adheres, and thereby this light is not received by the image sensor 206. As to the above described first example embodiment, the light emitted from the light source 202 passes through the outer face of the windshield 105 where a raindrop does not adhere while the light emitted from the light source 202 reflects inside a raindrop adhering on the outer face of the windshield 105 and is then received by the image sensor 206.

Therefore, the second example embodiment obtains images of the raindrop detection image area 214, which may appear as an inverse of an image of the raindrop detection image area 214 obtained for the first example embodiment. Specifically, as to the first example embodiment, an image having higher luminance is obtained as a raindrop adhered portion as shown in FIG. 15, and as to the second example embodiment, an image having lower luminance is obtained as a raindrop adhered portion as shown in FIG. 27. Therefore, as to the first example embodiment, the greater the total sum of pixels, the greater the raindrop amount, while as to the second example embodiment, the smaller the total sum of pixels, the greater the raindrop amount.

Figure 28:
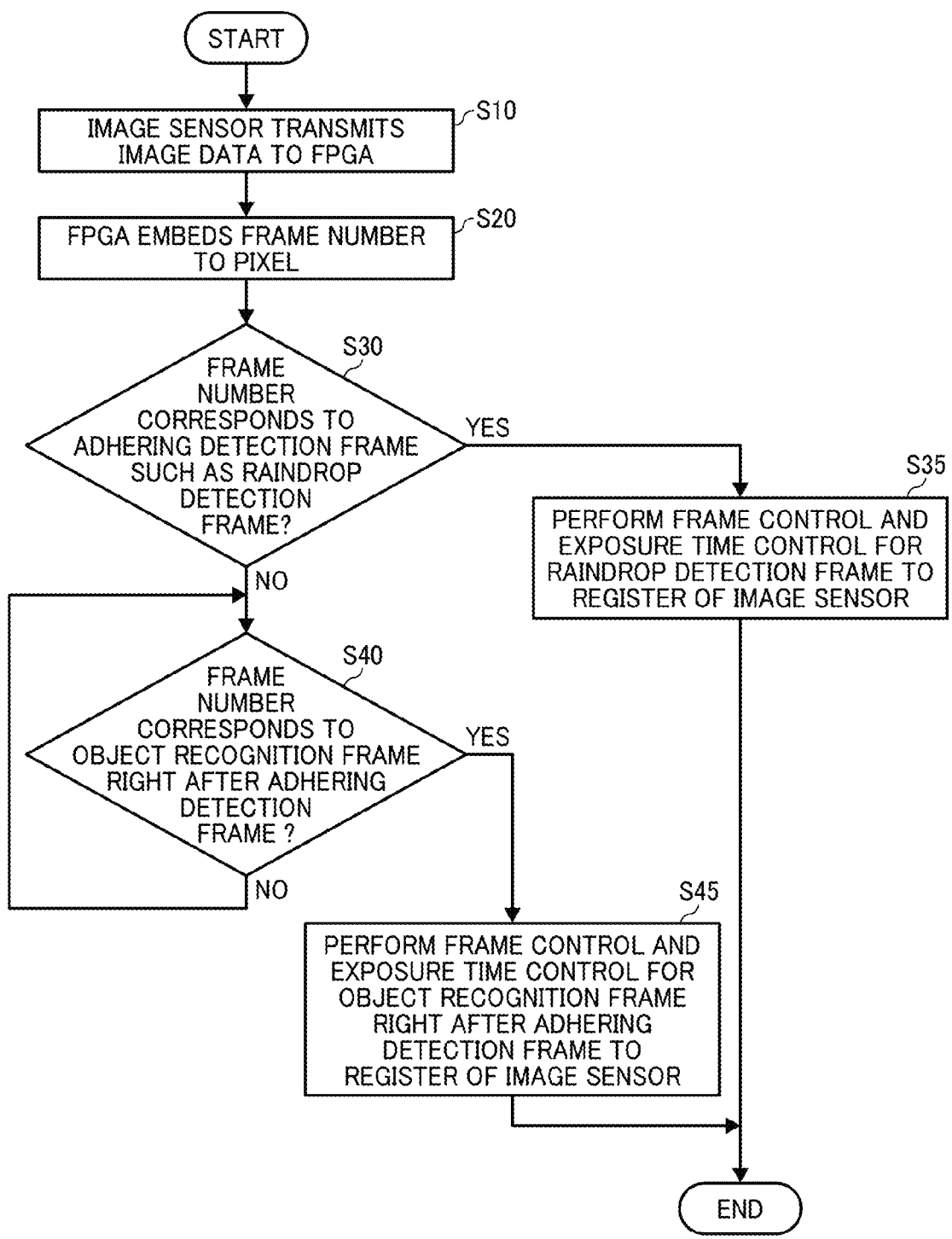
FIG. 28 is a flow chart showing the steps of capturing an adhering detection frame and object recognition frames according to one or more example embodiments.

A description is given of a method of capturing the adhering detection frame and the object recognition frames according to one or more example embodiments with reference to FIG. 28. The method of capturing images can be performed by the image capturing apparatus 101 including the light source 202 to emit first light to a light translucent member such as the windshield 105, an image sensor 206 to capture the adhering detection frame R4 for acquiring an adhering detection image to detect an adhering substance adhering on the light translucent member by using the first light emitted from the light source 202, and to capture a plurality of object recognition frames B0 to A3 for acquiring object recognition images for recognizing one or more objects other than the adhering substance by receiving second light, different from the first light emitted from the light source 202, by performing an image capturing operation repeatedly.

At first, the image sensor 206 transmits acquired image data to the image processing FPGA 360 (step 10), and the image processing FPGA 360 embeds frame numbers to pixels of the image data (step 20).

Then, it is determined whether the frame number corresponds to an adhering detection frame such as a raindrop detection frame (step 30). If the frame number corresponds to the raindrop detection frame (step 30: YES), the frame control and exposure time control for the raindrop detection frame is performed to a register of the image sensor 206 (step 35), in which the frame control can be performed by exposing only the raindrop detection image area 214 and outputting an image from the raindrop detection image area 214, or by exposing the entire image capturing area and then outputting an image only from the raindrop detection image area 214.

At step 35, the exposure time is set to a given value so that the exposure time of the raindrop detection frame and the exposure time of the object recognition frame right after the raindrop detection frame do not overlap with each other. Specifically, the exposure time of raindrop detection frame is monitored, and then the exposure time of the object recognition frame right after the raindrop detection frame is controlled based on the monitored exposure time of the raindrop detection frame so that the exposure time of the two frames do not overlap, in which images are captured by setting a frame time of the adhering detection frame R4 shorter than a frame time of each of the object recognition frames, and setting an exposure time of an object recognition frame right after the adhering detection frame R4 to a given value or less so that the exposure time of the adhering detection frame R4 does not overlap the exposure time of the object recognition frame right after the adhering detection frame R4. Then, the sequence ends.

Further, if the frame number does not correspond to the raindrop detection frame (step 30: NO), it is determined whether the frame number corresponds to an object recognition frame right after the adhering detection frame such as a raindrop detection frame (step 40). If the frame number corresponds to the object recognition frame right after the raindrop detection frame (step 40: YES), the frame control and exposure time control for the object recognition frame right after the raindrop detection frame is performed to the register of the image sensor 206 (step 45). At step 45, the exposure time is set to a given value so that the exposure time of the raindrop detection frame and the exposure time of the object recognition frame right after the raindrop detection frame do not overlap with each other. Specifically, the exposure time of raindrop detection frame is monitored, and then the exposure time of the object recognition frame right after the raindrop detection frame is controlled based on the monitored exposure time of raindrop detection frame so that the exposure time does not overlap, in which images are captured by setting a frame time of the adhering detection frame R4 shorter than a frame time of each of the object recognition frames, and setting an exposure time of an object recognition frame right after the adhering detection frame R4 to a given value or less so that the exposure period of the adhering detection frame R4 does not overlap the exposure period of the object recognition frame right after the adhering detection frame R4. Then, the sequence ends.

The above described example embodiments can be configured with following configurations.

(Configuration A)

As to the configuration A of the above described example embodiments, the image capturing apparatus 101 includes the light source 202 to emit first light to a light translucent member such as the windshield 105, the image sensor 206 to capture an adhering detection frame R4 for acquiring an adhering detection image to detect a substance such as the raindrop 203 adhering on the light translucent member by using the first light emitted from the light source 202, and to capture one or more object recognition frames B0, A1, B2, A3 for acquiring one or more object recognition images for recognizing one or more objects other than the substance (e.g., other vehicles, lanes, road surface, persons, obstacles) by receiving second light, different from the first light emitted from the light source 202, by performing an image capturing operation repeatedly of the adhering detection frame R4 and the object recognition frames B0, A1, B2, A3 repeatedly, and the circuitry to set a frame time of the adhering detection frame R4 shorter than a frame time of each of the object recognition frames B0, A1, B2, A3, and to set an exposure time of an object recognition frame right after the adhering detection frame R4 to a value that prevents overlapping of an exposure period of the adhering detection frame R4 and an exposure period of the object recognition frame right after the adhering detection frame R4.

For example, as indicated in FIG. 18, the frame time Rt of the adhering detection frame R4 is set shorter than the frame time Ft of the object recognition frame B0 to A3, and the exposure time of the object recognition frame B0 (or A1 in example configuration 3) right after the adhering detection frame R4 is set with a value that prevents overlapping of the exposure period ER4 of the adhering detection frame R4 and the exposure period EB0' (or EA1' in example configuration 3) of the object recognition frame right after the adhering detection frame R4.

In this configuration A, the frame time Rt of the adhering detection frame R4 is set shorter than the frame time Ft of the object recognition frames B0 to A3, and the exposure period ER4 of the adhering detection frame R4 is not overlapped by the exposure period EB0' of the sensing frame B0 right after the adhering detection frame R4. If the exposure period ER4 of the adhering detection frame R4 is not overlapped by the exposure period EB0' of the sensing frame B0 right after the adhering detection frame R4, received-light quantity data can be correctly acquired for both of the raindrop detection frame R4 and the sensing frame B0 right after the raindrop detection frame R4. Therefore, even if the frame time Rt of the adhering detection frame R4 is set shorter, the received-light quantity data can be correctly acquired for both of the raindrop detection frame R4 and the sensing frame B0 right after the raindrop detection frame R4.

Further, the received-light quantity data can be correctly acquired for both of the adhering detection frame and the sensing frame right after the adhering detection frame by using other method. For example, the blank time period can be set between the adhering detection frame and the sensing frame right after the adhering detection frame based on the exposure time of the sensing frame. With this method, the light-receiving start time of the sensing frame does not overlap the exposure period of the adhering detection frame right before the sensing frame. However, due to the blank time period, the time interval between one sensing frame before the adhering detection frame and one sensing frame after the adhering detection frame becomes greater. Therefore, as above described, situations may change greatly for the image capturing area between the sensing frames before and after the adhering detection frame, with which the object recognition precision deteriorates. Further, if the blank time period is set, the frame timing after the blank time period deviates, with which correct elapsed time cannot be detected if the elapsed time is counted based on the number of frames. As to the configuration A, the received-light quantity data can be correctly acquired for both of the adhering detection frame and the sensing frame right after the adhering detection frame without setting the blank time period.

(Configuration B)

In the configuration A, the object recognition frames B0 to A3 include an automatic exposure frame such as B0, B2 capturable by the image sensor 206 under an automatic exposure control that changes an exposure time automatically, and a locked-exposure frame such as A1, A3 capturable by the image sensor 206 with a locked exposure time, and the object recognition frame right after the adhering frame R4 is captured as the locked-exposure frame such as A1 exposed with the locked exposure time having a value that prevents overlapping of the exposure period of the adhering detection frame R4 and the exposure period of the object recognition frame right after the adhering frame R4. With this configuration, as described with the above the example configuration 3, the exposure period ER4 of the adhering detection frame R4 is not overlapped by the exposure period EA1' of the sensing frame A1 right after the adhering detection frame R4, and thereby the received-light quantity data can be correctly acquired for both of the raindrop detection frame R4 and the sensing frame A1 right after the raindrop detection frame R4 while maintaining the frame time Rt of the adhering detection frame R4 at a shorter time.

(Configuration C)

In the configuration B, the image capturing apparatus 101 further includes an image converter such as the image analyzer 102 to convert a first object recognition image acquired by setting the object recognition frame right after the adhering frame R4 as the locked-exposure frame to a second object recognition image based on an exposure time set for capturing the automatic exposure frame. With this configuration, an object recognition image captured by using the locked-exposure frame can be converted to an image based on the exposure time of the automatic exposure frame, with which processing error caused by different exposure time between the frames can be reduced.

(Configuration D)

In the configuration A, the object recognition frames B0, A1, B2, A3 include an automatic exposure frame such as B0, B2 capturable by the image sensor 206 under an automatic exposure control that changes an exposure time automatically, and the object recognition frame right after the adhering detection frame R4 is captured as the automatic exposure frame such as B0, the circuitry sets a upper limit of an exposure time of the object recognition frame right captured as the automatic exposure frame after the adhering detection frame R4, the upper limit changeable by the automatic exposure control, to a value that prevents overlapping of the exposure period ER4 of the adhering detection frame R4 and the exposure period EB0' of the object recognition frame B0 captured as the automatic exposure frame right after the adhering detection frame R4. With this configuration, as described with the above example configuration 1, the exposure period ER4 of the adhering detection frame R4 is not overlapped by the exposure period EB0' of the sensing frame B0 right after the adhering detection frame R4. Therefore, the received-light quantity data can be correctly acquired for both of the raindrop detection frame R4 and the sensing frame B0 right after the raindrop detection frame R4 while maintaining the frame time Rt of the adhering detection frame R4 at a shorter time.

(Configuration E)

In the configuration D, the image capturing apparatus 101 further includes an image converter 102. When an exposure time of automatic exposure frame not right after the adhering detection frame R4 (e.g., exposure time EB0 of automatic exposure frame B0 not right after the adhering detection frame R4) is set greater than the upper limit, the image converter 102 converts a third object recognition image acquired by capturing the object recognition frame right after the adhering frame R4 as the automatic exposure frame to a fourth object recognition image based on the exposure time set greater than the upper limit. With this configuration, an object recognition image acquired by capturing the automatic exposure frame B0 right after the adhering detection frame R4 can be converted to an image based on the exposure time of other automatic exposure frame B0 not right after the adhering detection frame R4, with which processing error caused by different exposure time between the frames can be reduced.

(Configuration F)

In any one of the configurations A to E, the image sensor 206 includes first light receiving elements such as the photodiodes 206A used for acquiring an adhering detection image of the adhering detection frame R4, and second light receiving elements such as the photodiodes 206A used for acquiring object recognition images of the object recognition frames B0, A1, B2, A3, and the number of the first light receiving elements is smaller than the number of the second light receiving elements, wherein each of the light receiving elements is, for example, a photodiode. With this configuration, the frame time Rt of the adhering detection frame R4 can be set shorter.

(Configuration G)

In the configuration F, the image capturing operation employs a rolling shutter method, and the image sensor 206 starts outputting of data from the first light receiving elements such as the photodiodes 206A used for acquiring the adhering detection image of the adhering detection frame R4. With this configuration, the frame time Rt of the adhering detection frame R4 can be set further shorter.

(Configuration H)

In any one of the configurations A to G, the image capturing apparatus 101 further includes a light source controller such as the exposure controller 109 to perform a light emission control of the light source 202, and the image capturing operation employs the rolling shutter method. When the image capturing operation employs the rolling shutter method. the light source controller 109 performs the light emission control of the light source 202 for one raindrop detection frame R4 by setting at least one time period emitting the first light from the light source 202, and another one time period not emitting the first light from the light source 202 during the exposure period of the one raindrop detection frame R4, and the circuitry sets the exposure time of an object recognition frame right after the adhering detection frame R4 to a value that prevents overlapping of the exposure period of the adhering detection frame R4 irradiated by the first light emitted from the light source 202 and the exposure period of the object recognition frame right after the adhering detection frame R4. With this configuration, a difference of the received-light quantity during the exposure period irradiated by the light of the light source 202 and the received-light quantity during the exposure period not irradiated by the light of the light source 202 can be obtained, and then the effect of ambient light can be removed based on the obtained difference, and thereby the detection precision of substance such as raindrop can be enhanced.

(Configuration I)

As to the configuration I related of the above described configurations A to H, the method of capturing images by using the image capturing apparatus 101 includes the steps of emitting first light from the light source 202 to the light translucent member 105, capturing an adhering detection frame R4 for acquiring an adhering detection image to detect a substance adhering on the light translucent member 105 by using the first light emitted from the light source 202 and the image sensor 206, capturing one or more object recognition frames B0, A1, B2, A3 for acquiring one or more object recognition images for recognizing one or more objects other than the substance by receiving second light, different from the first light emitted from the light source 202, by using the image sensor 206 by repeatedly performing an image capturing operation of the adhering detection frame R4 and the object recognition frames B0, A1, B2, A3, setting a frame time of the adhering detection frame R4 shorter than a frame time of each of the object recognition frames B0, A1, B2, A3, and setting an exposure time of an object recognition frame right after the adhering detection frame R4 to a value that prevents overlapping of an exposure period of the adhering detection frame R4 and an exposure period of the object recognition frame right after the adhering detection frame R4. With this configuration, even under dark environment such as in the tunnel or night, the exposure period of the adhering detection frame is not overlapped by the exposure period of the sensing frame right after the adhering detection frame, and the received-light quantity data can be correctly acquired for both of the raindrop detection frame and the sensing frame right after the raindrop detection frame while maintaining the frame time of the adhering detection frame at a shorter time.

(Configuration J)

As to a configuration J of the above described example embodiments, a computer-readable carrier medium or storage medium storing a program that, when executed by a computer, causes the computer to execute a method of capturing images by using the image capturing apparatus 101 including the steps of the steps of emitting first light from the light source 202 to the light translucent member 105, capturing an adhering detection frame R4 for acquiring an adhering detection image to detect a substance adhering on the light translucent member 105 by using the first light emitted from the light source 202 and the image sensor 206, capturing one or more object recognition frames B0, A1, B2, A3 for acquiring one or more object recognition images for recognizing one or more objects other than the substance by receiving second light, different from the first light emitted from the light source 202, by using the image sensor 206 by repeatedly performing an image capturing operation of the adhering detection frame R4 and the object recognition frames B0, A1, B2, A3, setting a frame time of the adhering detection frame R4 shorter than a frame time of each of the object recognition frames B0, A1, B2, A3, and setting an exposure time of an object recognition frame right after the adhering detection frame R4 to a value that prevents overlapping of an exposure period of the adhering detection frame R4 and an exposure period of the object recognition frame right after the adhering detection frame R4. With this configuration, even under dark environment such as in the tunnel or night, the exposure period of the adhering detection frame is not overlapped by the exposure period of the sensing frame right after the adhering detection frame, and the received-light quantity data can be correctly acquired for both of the raindrop detection frame and the sensing frame right after the raindrop detection frame while maintaining the frame time of the adhering detection frame at a shorter time.

(Configuration K)

As to a configuration K of the above described example embodiments, the device control system 1000 to control vehicle-mounted devices includes one or more device controllers such as the headlight controller 103, the wiper controller 106, and the vehicle controller 108 to control one or more devices such as the headlight 104, the wiper 107, a warning device, and brakes mounted to a moveable apparatus such as the vehicle 100 based on the adhering detection image and object recognition images captured by the image capture device 200, in which the image capture device 200 can employ any one of the configurations A to H. With this configuration, the devices mounted to the moveable apparatus can be controlled further effectively.

As to the above described one or, more example embodiments, even if the frame time of the adhering detection frame is set shorter, the received-light quantity data can be correctly acquired for both of the adhering detection frame and the sensing frame right after the adhering detection frame.

The present invention can be implemented in any convenient form, for example using dedicated hardware platform, or a mixture of dedicated hardware platform and software. Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions. For example, in some embodiments, any one of the information processing apparatus may include a plurality of computing devices, e.g., a server cluster, that are configured to communicate with each other over any type of communication links, including a network, a shared memory, etc. to collectively perform the processes disclosed herein.

The computer software can be provided to the programmable device using any storage medium or carrier medium such as non-volatile memory for storing processor-readable code such as a floppy disk, a flexible disk, a compact disk read only memory (CD-ROM), a compact disk rewritable (CD-RW), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a flash memory, Blu-ray disc (registered trademark), secure digital (SD) card, a solid state memory device or the like, but not limited these. Further, the computer software can be provided through communication lines such as electrical communication line. Further, the computer software can be provided in a read only memory (ROM) disposed for the computer. The computer software stored in the storage medium can be installed to the computer and executed to implement the above described processing. The computer software stored in the storage medium of an external apparatus can be downloaded and installed to the computer via a network to implement the above described processing.

The hardware platform includes any desired kind of hardware resources including, for example, a central processing unit (CPU), a random access memory (RAM), and a hard disk drive (HDD). The CPU may be implemented by any desired kind of any desired number of processors. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

In the above-described example embodiment, a computer can be used with a computer-readable program, described by object-oriented programming languages such as C, C++, C#, Java (registered trademark), JavaScript (registered trademark), Perl, Ruby, or legacy programming languages such as machine language, assembler language to control functional units used for the apparatus or system. For example, a particular computer (e.g., personal computer, workstation) may control an information processing apparatus or an image processing apparatus such as image forming apparatus using a computer-readable program, which can execute the above-described processes or steps. In the above-described embodiments, at least one or more of the units of apparatus can be implemented as hardware or as a combination of hardware/software combination. Each of the functions of the described embodiments may be implemented by one or more processing circuits. A processing circuit includes a programmed processor, as a processor includes circuitry. A processing circuit also includes devices such as an application specific integrated circuit (ASIC) and conventional circuit components arranged to perform the recited functions.

Numerous additional modifications and variations for the communication terminal, information processing system, and information processing method, a program to execute the information processing method by a computer, and a storage or carrier medium of the program are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. An image capturing apparatus comprising:
   a light source to emit first light to a light translucent member;
   an image sensor to capture an adhering detection frame for acquiring an adhering detection image to detect a substance adhering on the light translucent member by using the first light emitted from the light source, and to capture one or more object recognition frames for acquiring one or more object recognition images for recognizing one or more objects other than the substance by receiving second light, different from the first light emitted from the light source, by performing an image capturing operation of the adhering detection frame and the object recognition frames repeatedly; and
   circuitry to set a frame time of the adhering detection frame shorter than a frame time of each of the object recognition frames, and to set an exposure time of an object recognition frame right after the adhering detection frame to a value that prevents overlapping of an exposure period of the adhering detection frame and an exposure period of the object recognition frame right after the adhering detection frame.

2. The image capturing apparatus of claim 1, wherein the object recognition frames include an automatic exposure frame capturable by the image sensor under an automatic exposure control that changes an exposure time automatically, and a locked-exposure frame capturable by the image sensor with a locked exposure time, wherein the object recognition frame right after the adhering frame is captured as the locked-exposure frame exposed with the locked exposure time having a value that prevents overlapping of the exposure period of the adhering detection frame and the exposure period of the object recognition frame captured as the locked-exposure frame right after the adhering frame.

3. The image capturing apparatus of claim 2, further comprising an image converter to convert a first object recognition image acquired by setting the object recognition frame right after the adhering frame as the locked-exposure frame to a second object recognition image based on an exposure time set for capturing the automatic exposure frame.

4. The image capturing apparatus of claim 1, wherein the object recognition frames include an automatic exposure frame capturable by the image sensor under an automatic exposure control that changes an exposure time automatically, wherein the object recognition frame right after the adhering detection frame is captured as the automatic exposure frame, wherein the circuitry sets a upper limit of an exposure time of the object recognition frame captured as the automatic exposure frame right after the adhering detection frame, the upper limit changeable by the automatic exposure control, to a value that prevents overlapping of the exposure period of the adhering detection frame and the exposure period of the object recognition frame captured as the automatic exposure frame right after the adhering detection frame.

5. The image capturing apparatus of claim 4, further comprising an image converter, wherein when an exposure time of an automatic exposure frame not right after the adhering detection frame is set greater than the upper limit, the image converter converts a third object recognition image acquired by capturing the object recognition frame as the automatic exposure frame right after the adhering frame to a fourth object recognition image based on the exposure time set greater than the upper limit.

6. The image capturing apparatus of claim 1, wherein the image sensor includes first light receiving elements used for acquiring the adhering detection image of the adhering detection frame, and second light receiving elements used for acquiring the one or more object recognition images of the object recognition frames, and the number of the first light receiving elements is smaller than the number of the second light receiving elements.

7. The image capturing apparatus of claim 6, wherein the image capturing operation employs a rolling shutter method, and the image sensor starts outputting of data from the first light receiving elements used for acquiring the adhering detection image of the adhering detection frame.

8. The image capturing apparatus of claim 1, further comprising:

a light source controller to perform a light emission control of the light source, wherein the image capturing operation employs the rolling shutter method, wherein the light source controller performs the light emission control of the light source for the adhering detection frame by setting at least one time period emitting the first light from the light source, and another one time period not emitting the first light from the light source during the exposure period of the adhering detection frame, wherein the circuitry sets the exposure time of the object recognition frame right after the adhering detection frame to a value that prevents overlapping of the exposure period of the adhering detection frame irradiated by the first light emitted from the light source and the exposure period of the object recognition frame right after the adhering detection frame.

9. A method of capturing images by using an image capturing apparatus, comprising the steps of:

emitting first light from a light source to a light translucent member;

capturing an adhering detection frame for acquiring an adhering detection image to detect a substance adhering on the light translucent member by using the first light emitted from the light source and an image sensor;

capturing one or more object recognition frames for acquiring one or more object recognition images for recognizing one or more objects other than the substance by receiving second light, different from the first light emitted from the light source, by using the image sensor by repeatedly performing an image capturing operation of the adhering detection frame and the object recognition frames;

setting a frame time of the adhering detection frame shorter than a frame time of each of the object recognition frames; and setting an exposure time of an object recognition frame right after the adhering detection frame (R4) to a value that prevents overlapping of an exposure period of the adhering detection frame and an exposure period of the object recognition frame right after the adhering detection frame.

10. A non-transitory computer-readable storage medium storing a program that, when executed by a computer, causes the computer to execute a method of capturing images by using an image capturing apparatus, the method comprising the steps of:

emitting first light from a light source to a light translucent member;

capturing an adhering detection frame for acquiring an adhering detection image to detect a substance adhering on the light translucent member by using the first light emitted from the light source and an image sensor;

capturing one or more object recognition frames for acquiring one or more object recognition images for recognizing one or more objects other than the substance by receiving second light, different from the first light emitted from the light source, by using the image sensor by repeatedly performing an image capturing operation of the adhering detection frame and the object recognition frames;

setting a frame time of the adhering detection frame shorter than a frame time of each of the object recognition frames; and setting an exposure time of an object recognition frame right after the adhering detection frame (R4) to a value that prevents overlapping of an exposure period of the adhering detection frame and an exposure period of the object recognition frame right after the adhering detection frame.

11. A device control system to control vehicle-mounted devices comprising:

the image capturing apparatus of claim 1 to capture the adhering detection image and the object recognition images; and one or more device controllers to control one or more devices mounted in a vehicle based on the adhering detection image and the object recognition images captured by the image capturing apparatus.

* * * * *